US012634832B2

(12) United States Patent
Wang et al.

(10) Patent No.: US 12,634,832 B2
(45) Date of Patent: May 19, 2026

(54) METHOD, DEVICE AND COMPUTER STORAGE MEDIUM OF COMMUNICATION

(71) Applicant: NEC CORPORATION, Tokyo (JP)

(72) Inventors: Gang Wang, Beijing (CN); Lin Liang, Beijing (CN)

(73) Assignee: NEC CORPORATION, Tokyo (JP)

( * ) Notice: Subject to any disclaimer, the term of this patent is extended or adjusted under 35 U.S.C. 154(b) by 356 days.

(21) Appl. No.: 18/270,951

(22) PCT Filed: Jan. 13, 2021

(86) PCT No.: PCT/CN2021/071538
§ 371 (c)(1),
(2) Date: Jul. 5, 2023

(87) PCT Pub. No.: WO2022/151065
PCT Pub. Date: Jul. 21, 2022

(65) Prior Publication Data
US 2024/0080774 A1 Mar. 7, 2024

(51) Int. Cl.
*H04L 5/00* (2006.01)
*H04L 1/1812* (2023.01)
*H04W 52/14* (2009.01)
*H04W 72/232* (2023.01)

(52) U.S. Cl.
CPC ......... *H04W 52/146* (2013.01); *H04L 1/1812* (2013.01); *H04W 72/232* (2023.01)

(58) Field of Classification Search
CPC . H04W 52/146; H04W 52/54; H04W 52/325; H04W 52/48; H04L 1/1812; H04L 5/0098; H04L 1/1854; H04L 5/0055; H04L 5/0094; H04L 5/001
See application file for complete search history.

(56) References Cited

U.S. PATENT DOCUMENTS

| | | | | |
|---|---|---|---|---|
| 11,129,152 B2 * | 9/2021 | You | ........................ | H04L 5/0053 |
| 11,284,413 B2 * | 3/2022 | Dinan | ................. | H04W 72/569 |
| 2016/0227486 A1 | 8/2016 | Park | | |

(Continued)

FOREIGN PATENT DOCUMENTS

| | | |
|---|---|---|
| CN | 110351056 A | 10/2019 |
| CN | 111903170 A | 11/2020 |

(Continued)

OTHER PUBLICATIONS

Extended European Search Report for EP Application No. 21918280. 5, dated on Feb. 9, 2024.

(Continued)

*Primary Examiner* — Lan-Huong Truong
(74) *Attorney, Agent, or Firm* — Sughrue Mion, PLLC

(57) ABSTRACT

Embodiments of the present disclosure relate to methods, devices and computer readable media for communication. A terminal device determines a target cell from a set of cells, the set of cells being configured for uplink control transmissions for HARQ feedbacks for downlink data transmissions received on cells in a cell group, and transmits, on the target cell and to a network device, an uplink control transmission for a HARQ feedback for a downlink data transmission received on one of the cells in the cell group. In this way, a latency for HARQ feedback can be reduced.

9 Claims, 11 Drawing Sheets

(56)        References Cited

U.S. PATENT DOCUMENTS

| | | |
|---|---|---|
| 2016/0286495 A1 | 9/2016 | Dinan |
| 2019/0074935 A1* | 3/2019 | Babaei .................. H04L 1/1812 |
| 2020/0366446 A1* | 11/2020 | Matsumura ........... H04L 5/0055 |
| 2022/0182899 A1* | 6/2022 | Li .......................... H04W 72/21 |
| 2022/0304016 A1* | 9/2022 | Sun ....................... H04W 72/23 |

FOREIGN PATENT DOCUMENTS

| | | |
|---|---|---|
| EP | 2833686 B1 | 2/2018 |
| WO | 2016/162090 A1 | 10/2016 |
| WO | 2016/162791 A1 | 10/2016 |
| WO | 2022/083671 A1 | 4/2022 |

OTHER PUBLICATIONS

JP Office Action for JP Application No. 2023-542531, mailed on Jan. 7, 2025 with English Translation.

Nokia, Nokia Shanghai Bell, "HARQ-ACK Feedback Enhancements for URLLC /IIoT," 3GPP TSG RAN WG1 #103-e R1-2008842, Nov. 1, 2020.

Huawei et al., "UE feedback enhancements for HARQ-ACK", 3GPP TSG RAN WG1 Meeting #102-e, R1-2005243, Aug. 17-28, 2020, 8 pgs.

Huawei et al., "UE feedback enhancements for HARQ-ACK", 3GPP TSG RAN WG1 Meeting #103-e, R1-2007565, Oct. 26-Nov. 13, 2020, 8 pgs.

International Search Report for PCT/CN2021/071538 dated, Oct. 14, 2021 (PCT/ISA/210).

Written Opinion of the International Searching Authority for PCT/CN2021/071538 dated, Oct. 14, 2021 (PCT/ISA/237).

JP Office Action for JP Application No. 2023-542531, mailed on Jul. 16, 2024 with English Translation.

* cited by examiner

100

200A

DL slot | UL slot | Flexible slot | DCI | PDSCH | PUCCH

200B

DL slot | UL slot | Flexible slot | DCI | PDSCH | PUCCH

400A

401

402

400B

403

404

600C

Priority

High

Low

700

Priority

High

Low

1200 ⟍

⌐1210

RECEIVE, AT A NETWORK DEVICE AND FROM A TERMINAL DEVICE, A
HARQ FEEDBACK ON A TARGET CELL, THE HARQ FEEDBACK FOR A
DOWNLINK DATA TRANSMISSION TRANSMITTED FROM ONE OF
CELLS IN A CELL GROUP, THE TARGET CELL BEING DETERMINED
FROM A SET OF CELLS CONFIGURED FOR HARQ FEEDBACKS FOR
DOWNLINK DATA TRANSMISSIONS RECEIVED FROM THE CELLS IN
THE CELL GROUP

METHOD, DEVICE AND COMPUTER STORAGE MEDIUM OF COMMUNICATION

CROSS REFERENCE TO RELATED APPLICATIONS

This application is a National Stage of International Application No. PCT/CN2021/071538 filed Jan. 13, 2021.

TECHNICAL FIELD

Embodiments of the present disclosure generally relate to the field of telecommunication, and in particular, to methods, devices and computer storage media of communication for hybrid automatic repeat request (HARQ) feedback.

BACKGROUND

In new radio (NR) Release 16, for a terminal device configured with carrier aggregation (CA), only an uplink (UL) carrier of a component carrier (CC) is configured to transmit a physical uplink control channel (PUCCH) for HARQ feedback within a cell group, e.g., primary cell.

In NR Release 17, in order to reduce a latency of HARQ feedback for downlink (DL) heavy configurations in unpaired spectrum, PUCCH carrier switching for HARQ feedback is proposed to allow more than one UL carrier with different time division duplexing (TDD) configurations for PUCCH transmission for HARQ feedback. In this case, how to implement the PUCCH carrier switching needs to be studied.

SUMMARY

In general, embodiments of the present disclosure provide methods, devices and computer storage media of communication for HARQ feedback.

In a first aspect, there is provided a method of communication. The method comprises: determining, at a terminal device, a target cell from a set of cells, the set of cells being configured for uplink control transmissions for HARQ feedbacks for downlink data transmissions received on cells in a cell group; and transmitting, on the target cell and to a network device, an uplink control transmission for a HARQ feedback for a downlink data transmission received on one of the cells in the cell group.

In a second aspect, there is provided a method of communication. The method comprises: receiving, at a network device and from a terminal device, an uplink control transmission for a HARQ feedback on a target cell, the HARQ feedback for a downlink data transmission transmitted on one of cells in a cell group, the target cell being determined from a set of cells configured for an uplink control transmission for HARQ feedbacks for downlink data transmissions received on the cells in the cell group.

In a third aspect, there is provided a terminal device. The terminal device comprises a processor configured to perform the method according to the first aspect of the present disclosure.

In a fourth aspect, there is provided a network device. The network device comprises a processor configured to perform the method according to the second aspect of the present disclosure.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
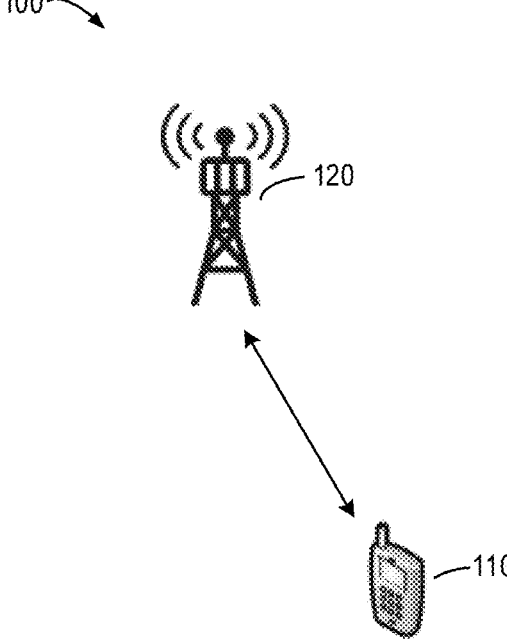
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device or the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As mentioned above, in NR Release 17, in order to reduce the latency of HARQ feedback for DL heavy configurations in unpaired spectrum, PUCCH carrier switching for HARQ feedback is proposed to allow more than one UL carrier or cell with different TDD configurations for PUCCH transmission for HARQ feedback. However, how to implement the PUCCH carrier switching needs to be studied, for example, how to configure or define PUCCH resource for the one or more switched cells and the association between DL carrier for PDSCH reception and UL carrier for PUCCH transmission, how to indicate to a terminal device when and where to switch PUCCH transmission on another cell or UL carrier for HARQ feedback, or how to operate power control for PUCCH transmission if the more than one UL carrier or cell are configured for PUCCH transmission.

In view of this, embodiments of the present disclosure provide a solution for PUCCH carrier switching. In the solution, for a cell group provided by a network device to a terminal device, a set of cells is configured for PUCCH transmission for HARQ feedback of downlink data transmissions on cells in the cell group. The terminal device can make PUCCH carrier switching among the set of cells as needed. In this way, a latency for HARQ feedback can be reduced.

Embodiments of the present disclosure may be applied to any suitable scenarios. For example, embodiments of the present disclosure may be implemented at ultra reliable low latency communication (URLLC). Alternatively, embodiments of the present disclosure can be implemented in one of the followings: reduced capability NR devices, NR multiple-input and multiple-output (MIMO), NR sidelink enhancements, NR systems with frequency above 52.6 GHz, an extending NR operation up to 71 GHz, narrow band-Internet of Thing (NB-IOT)/enhanced Machine Type Communication (eMTC) over non-terrestrial networks (NTN), NTN, UE power saving enhancements, NR coverage enhancement, NB-IoT and LTE-MTC, Integrated Access and Backhaul (IAB), NR Multicast and Broadcast Services, or enhancements on Multi-Radio Dual-Connectivity.

Principles and implementations of the present disclosure will be described in detail below with reference to the figures.

Example of Communication Network

FIG. 1 illustrates a schematic diagram of an example communication network 100 in which some embodiments of the present disclosure can be implemented. As shown in FIG. 1, the communication network 100 may include a terminal device 110 and a network device 120. In some embodiments, the terminal device 110 may be served by the network device 120. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

As shown in FIG. 1, the terminal device 110 may communicate with the network device 120 via a channel such as a wireless communication channel. The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G 2.75G, the third generation (3G), the fourth generation (4G), 4.5G the fifth generation (5G) communication protocols.

In some embodiments, the terminal device 110 may transmit uplink data information to the network device 120 via an uplink data channel transmission. For example, the uplink data channel transmission may be a physical uplink shared channel (PUSCH) transmission. Of course, any other suitable forms are also feasible.

In some embodiments, the terminal device 110 may transmit UCI, e.g., HARQ feedback information to the network device 120 via an uplink control channel transmission. For example, the uplink control channel transmission may be a PUCCH transmission. Of course, any other suitable forms are also feasible.

In some embodiments, the network device 120 may support a plurality of services have different priorities for the terminal device 110, for example, eMBB with a lower priority and URLLC with a higher priority. Accordingly, the terminal device 110 may perform respective uplink data and/or control channel transmissions for the different services. The uplink control channel transmissions may carry HARQ feedbacks for different services and the HARQ feedbacks may have different priorities corresponding to different services.

In some embodiments, the network device 120 may provide a plurality of serving cells (not shown herein) for the terminal device 110, for example, a primary cell (Pcell), a primary secondary cell (PScell), a secondary cell (Scell), a special cell (sPCell) or the like. Each of the serving cells may correspond to a CC. The terminal device 110 may perform transmission with the network device 120 via a CC. Of course, the terminal device 110 may perform transmission with the network device 120 via multiple CCs, for example, in case of CA.

Figure 2A:
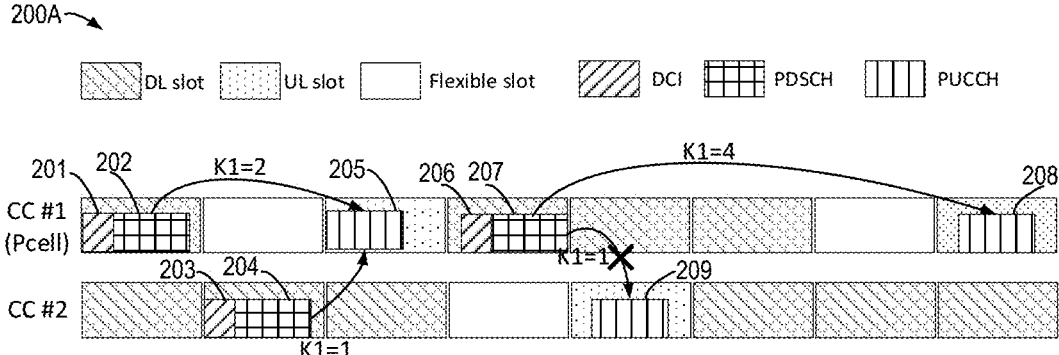
FIG. 2A illustrates a schematic diagram illustrating an example scenario for HARQ feedback according to conventional solutions.

In some scenarios, a cell group is provided by the network device 120 to the terminal device 110. According to conventional solutions, only one cell within the cell group is configured with UL carrier for PUCCH transmission for HARQ-ACK of PDSCH receptions on all cells in the cell group. FIG. 2A illustrates a schematic diagram 200A illustrating an example scenario for HARQ feedback according to conventional solutions. In this example, a cell group provided by a network device to a terminal device comprises CC #1 and CC #2, and CC #1 as a Pcell is configured for PUCCH transmission for HARQ feedback for the cell group.

As shown in FIG. 2A, DCI 201 may indicate that a HARQ feedback for PDSCH 202 is transmitted by PUCCH 205 on CC #1, for example, with a HARQ-ACK timing value K1=2. DCI 203 may indicate that a HARQ feedback for PDSCH 204 is also transmitted by PUCCH 205, for example, with a HARQ-ACK timing value K1=1. DCI 206 may indicate that a HARQ feedback for PDSCH 207 is transmitted by PUCCH 208 on CC #1, for example, with a HARQ-ACK timing value K1=4. However, there is an UL slot on CC #2 can be used for PUCCH 209, which is earlier than the PUCCH 208 on CC #1. According to conventional solutions, the HARQ feedback for the PDSCH 207 cannot be scheduled to be transmitted by the PUCCH 209 as only CC #1 is configured for PUCCH transmission for the cell group.

Figure 2B:
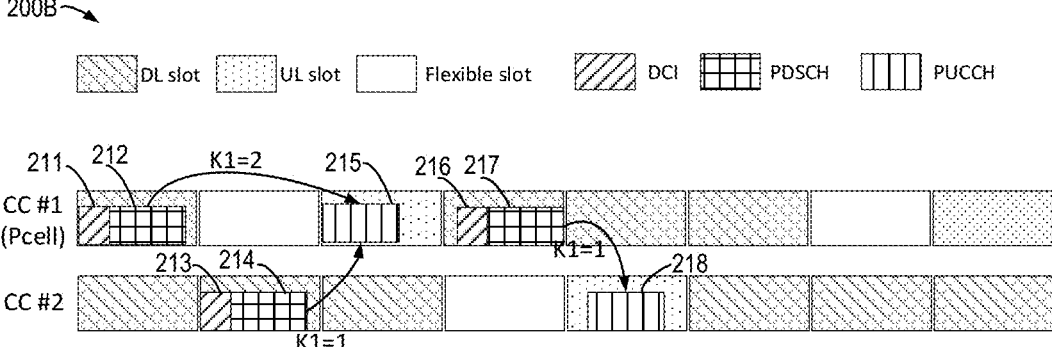
FIG. 2B illustrates a schematic diagram illustrating an example scenario of a PUCCH carrier switching for HARQ feedback according to embodiments of the present disclosure.

According to embodiments of the present disclosure, PUCCH for HARQ feedback can be transmitted on a cell with early available UL symbols within the cell group. FIG. 2B illustrates a schematic diagram 200B illustrating an example scenario of a PUCCH carrier switching for HARQ feedback according to embodiments of the present disclosure. In this example, the cell group provided by the network device 120 to the terminal device 110 may comprise CC #1 and CC #2, and CC #1 as a Pcell is configured for HARQ feedback for the cell group. It is to be understood that this is merely an example, and any other suitable numbers of CCs are also feasible.

As shown in FIG. 2B, DCI 211 may indicate that a HARQ feedback for PDSCH 212 is transmitted by PUCCH 215 that is early available on CC #1, for example, with a HARQ-ACK timing value K1=2. DCI 213 may indicate that a HARQ feedback for PDSCH 214 is also transmitted by PUCCH 215 that is also early available for PDSCH 214, for example, with a HARQ-ACK timing value K1=1. DCI 216 may indicate that a HARQ feedback for PDSCH 217 is transmitted by PUCCH 218 on CC #2 that is early available for PDSCH 217, for example, with a HARQ-ACK timing value K1=1. In this way, a lower latency of HARQ feedback can be achieved. Its details will be described below with reference to FIG. 3.

Example Implementation of HARQ Feedback with Pucch Carrier Switching

Figure 3:
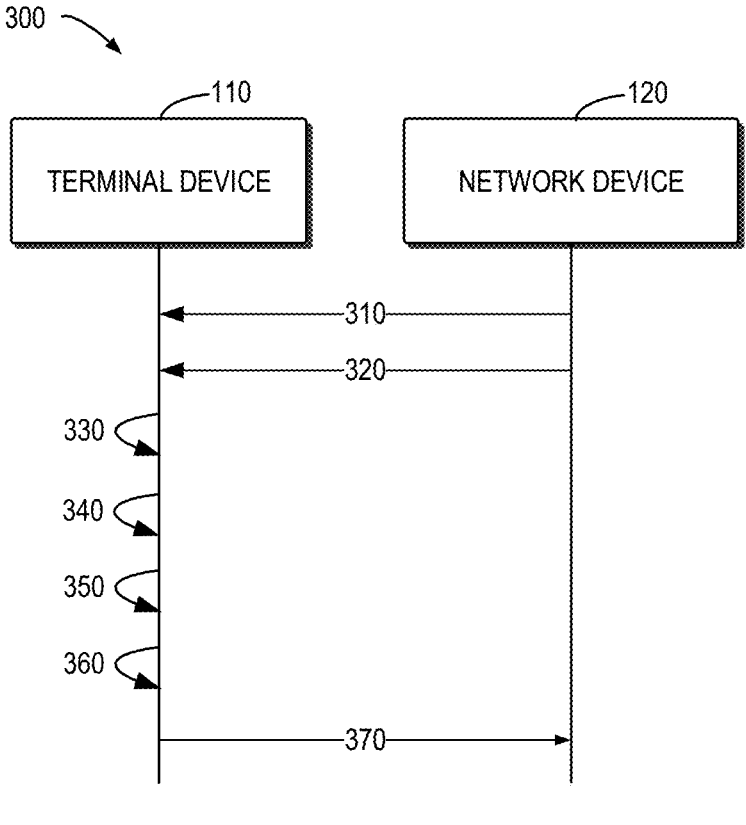
FIG. 3 illustrates a flow chart illustrating a process of communication for HARQ feedback according to embodiments of the present disclosure.

FIG. 3 illustrates a flow chart illustrating a process 300 of communication for HARQ feedback according to embodiments of the present disclosure. For the purpose of discussion, the process 300 will be described with reference to FIG. 1. The process 300 may involve the terminal device 110 and the network device 120 as illustrated in FIG. 1.

As shown in FIG. 3, the network device 120 transmits 310, to the terminal device 110, a configuration regarding a set of cells for uplink control transmissions (for example, PUCCH transmissions) for HARQ feedbacks for downlink data transmissions (for example, PDSCH transmissions) on cells within a cell group. In some embodiments, the cell group comprises a plurality of cells provided by the network device 120 to the terminal device 110. In some embodiments, the set of cells is selected from the plurality of cells in the cell group. In some embodiments, cells different from the cells in the cell group may be configured in the set of cells.

In some embodiments, the network device 120 may transmit 320 an indication indicating a PUCCH carrier switching. In this way, the terminal device 110 may determine a target cell based on the indication. The target cell is used for a PUCCH transmission for a HARQ feedback for PDSCH transmission on a cell in the cell group. Some example embodiments of the configuration and indication will be described in connection with Embodiments 1 and 2. In following description, a PUCCH cell refers to a cell configured for PUCCH transmission.

Embodiment 1

Figure 4A:
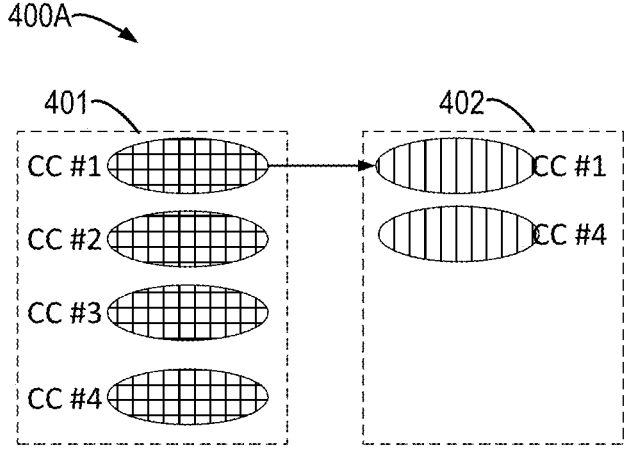
FIG. 4A illustrates a schematic diagram illustrating an example configuration for PUCCH carriers according to embodiments of the present disclosure.

In this embodiment, the set of cells may comprise multiple cells associated with the same cell group. This will be described in connection with FIG. 4A. FIG. 4A illustrates a schematic diagram 400A illustrating an example configuration for PUCCH carriers according to embodiments of the present disclosure. As shown in FIG. 4A, a cell group 401 comprising CC #1, CC #2, CC #3 and CC #4 is provided for the terminal device 110, and a set of cells 402 comprising CC #1 and CC #4 is configured for HARQ feedback for the cell group 401. It should be noted that the number of cells in the cell group is merely for illustration and is not for limitation.

In some embodiments, the network device 120 may transmit configurations for respective cells in the set of cells 402 to the terminal device 110. For example, the network device 120 may separately configure PUCCH-Config parameters for UL carriers in the set of cells 402.

In some alternative embodiments, the network device 120 may transmit, to the terminal device 110, a configuration comprising a first portion common for all cells in the set of cells 402 and second portions dedicated for respective cells in the set of cells 402. For example, the network device 120 may configure some common PUCCH related parameters in a PUCCH-Config parameter for UL carriers in the set of cells 402, e.g., PUCCH resource set, PUCCH format configuration, dl-DataToUL-ACK. In addition, the network device 120 may configure some separate PUCCH related parameters in the PUCCH-Config parameter for UL carriers in the set of cells 402, e.g., PUCCH-PowerControl.

In some embodiments, the network device 120 may transmit an indication indicating a cell in the set of cells as a target cell for PUCCH transmission. In other words, the indication may indicate a PUCCH carrier switching. For example, the network device 120 may transmit the indication via a RRC signaling or DCI indication. As another example, the network device 120 may transmit the indication via a media access control control element (MAC CE). Of course, any other suitable ways are also feasible.

In this way, a flexibility of configuration and less radio resource control (RRC) overhead can be obtained.

Embodiment 2

In this embodiment, the cell group may comprise a first subgroup of cells and a second subgroup of cells, and the set of cells may comprise a first PUCCH cell associated with the first subgroup of cells and a second PUCCH cell associated with the second subgroup of cells. In some embodiments, the network device 120 may transmit, to the terminal device 110, an indication that a third cell within the first subgroup of cells is switched to be associated with the second PUCCH cell. For example, the network device 120 may transmit the indication via a DCI indication. As another example, the network device 120 may transmit the indication via a MAC CE. Of course, any other suitable ways are also feasible. In this case, the terminal device 110 may determine the second PUCCH cell as the target cell for PUCCH transmission for HARQ feedback for a downlink data transmission received from the third cell.

Figure 4B:
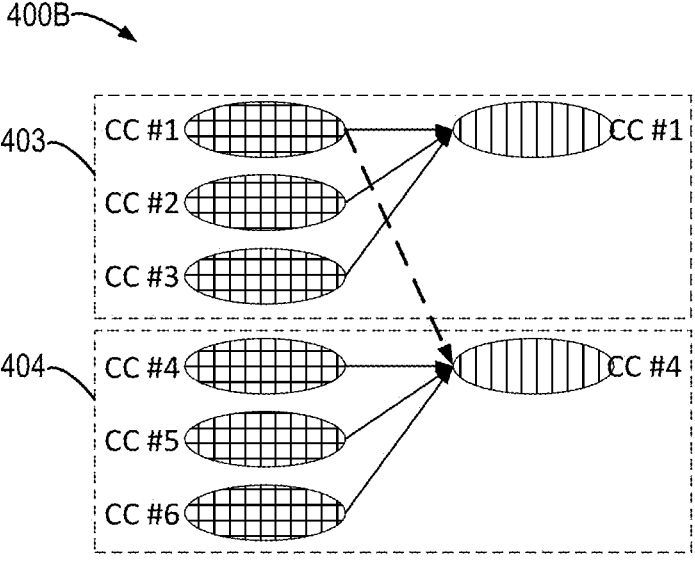
FIG. 4B illustrates a schematic diagram illustrating another example configuration for PUCCH carriers according to embodiments of the present disclosure.

In other words, in this embodiment, the set of cells may comprise multiple PUCCH cells associated with multiple cell groups, and each of the multiple cell groups may be switched among the multiple cells. This will be described in connection with FIG. 4B. FIG. 4B illustrates a schematic diagram 400B illustrating an example configuration for PUCCH carriers according to embodiments of the present disclosure. As shown in FIG. 4B, a cell group 403 comprising CC #1, CC #2 and CC #3 and a cell group 404 comprising CC #4, CC #5 and CC #6 are provided for the terminal device 110. In this embodiment, only one PUCCH cell is configured for each of the cell groups 403 and 404. For example, as shown in FIG. 4B, CC #1 is associated with the cell group 403, and CC #4 is associated with the cell group 404. It should be noted that the number of cells in the cell group and the number of cell groups are merely for illustration and are not for limitation.

In some embodiments, the network device 120 may transmit configurations for respective cell groups to the terminal device 110. For example, the network device 120 may separately configure PUCCH-Config parameters for respective cell groups.

In some embodiments, the network device 120 may transmit an indication that a cell (for example, CC #1) within the cell group 403 is switched to be associated with the CC #4, as shown by a broken line in FIG. 4B. In this case, the terminal device 110 may determine CC #4 as the target cell for HARQ feedback for a downlink data transmission received from the CC #1. It should be noted that the number of cells in the cell group and the number of the cell groups are merely for illustration and are not for limitation.

In this way, an impact on 3GPP specification can be reduced but RRC overhead may be increased.

Return to FIG. 3, upon receipt of the indication for PUCCH carrier switching, the terminal device 110 may perform 330 the PUCCH carrier switching based on the indication. In some embodiments, the terminal device 110 may determine slot k+N, where k (referenced to Pcell numerology) denotes an index of a slot for the PUCCH transmission for HARQ feedback of the PDSCH transmission comprising the indication, and N denotes a processing time for the HARQ feedback at the network device 120. Then the terminal device 110 may transmit, on the target cell, the PUCCH transmission for the HARQ feedback for the PDSCH transmission started after the slot k+N.

For example, if an UL carrier switched or updated by MAC CE for PUCCH transmission associated to a DL carrier, the terminal device 110 may apply the new indicated UL carrier for PUCCH transmission starting from the first slot that is after slot k+N. For example, $$N = 3 \cdot N_{slot}^{frame,\mu}$$

where $\mu$ denotes a subcarrier spacing configuration (also referred to as an index of a numerology herein), and $$N_{slot}^{frame,\mu}$$

denotes the number of slots per frame for subcarrier spacing configuration $\mu$.

Figure 5:
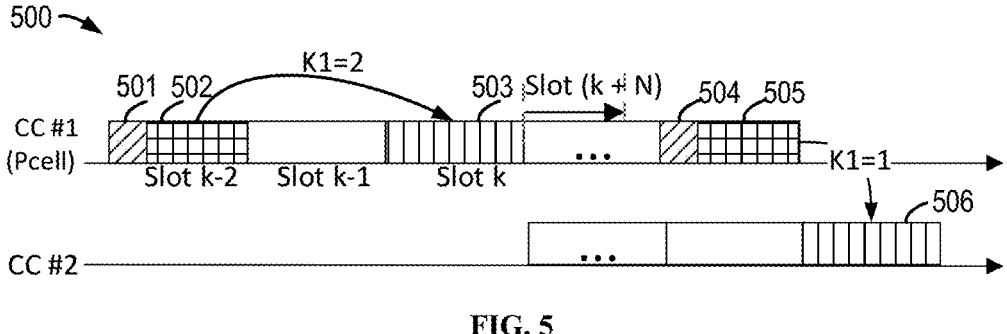
FIG. 5 illustrates a schematic diagram illustrating an example for starting a PUCCH carrier switching according to embodiments of the present disclosure.

FIG. 5 illustrates a schematic diagram 500 illustrating an example for starting a PUCCH carrier switching according to embodiments of the present disclosure. As shown in FIG. 5, a cell group comprises CC #1 and CC #2. DCI 501 may indicate that a HARQ feedback for PDSCH 502 is transmitted by PUCCH 503 on CC #1, for example, with a HARQ-ACK timing value K1=2. Assuming that the PDSCH 502 at slot k−2 comprises a MAC CE indicating a PDCCH carrier switching from CC #1 to CC #2.

In this case, the terminal device 110 may determine slot k+N, and transmit, on CC #2, the PUCCH transmission for the HARQ feedback for the PDSCH transmission started after the slot k+N. For example, DCI 504 may indicate that a HARQ feedback for PDSCH 505 is transmitted by PUCCH 506 on CC #2, for example, with a HARQ-ACK timing value K1=1. It should be noted that this is merely an example, and any other suitable occasions for PUCCH carrier switching are also feasible.

In this way, the communication is reliable and can ensure that the terminal device 110 and the network device 120 have same understanding on when or which carrier the terminal device 110 will use to transmit PUCCH for HARQ feedback, especially for the case that more than two cells or carriers are for PUCCH transmission, so that the network device 120 does not need to do blind decoding for PDCCH miss detection.

So far, the description is made on determination of the target cell based on indication from the network side. The following description is made on determination of the target cell for PUCCH transmission from the set of cells based on a predefined rule.

With reference to FIG. 3, the terminal device 110 may determine 340 a reference numerology from numerologies corresponding to the set of cells for PUCCH transmission. Based on the reference numerology and a timing value (also referred to as HARQ-ACK timing value herein) indicated by DCI or configured by RRC, the terminal device 110 may determine 350 a reference slot for transmitting the HARQ feedback. Then the terminal device 110 may determine 360 the target cell from the set of cells in the reference slot. This will be described in connection with Embodiments 3 to 5.

Embodiment 3

Figure 6A:
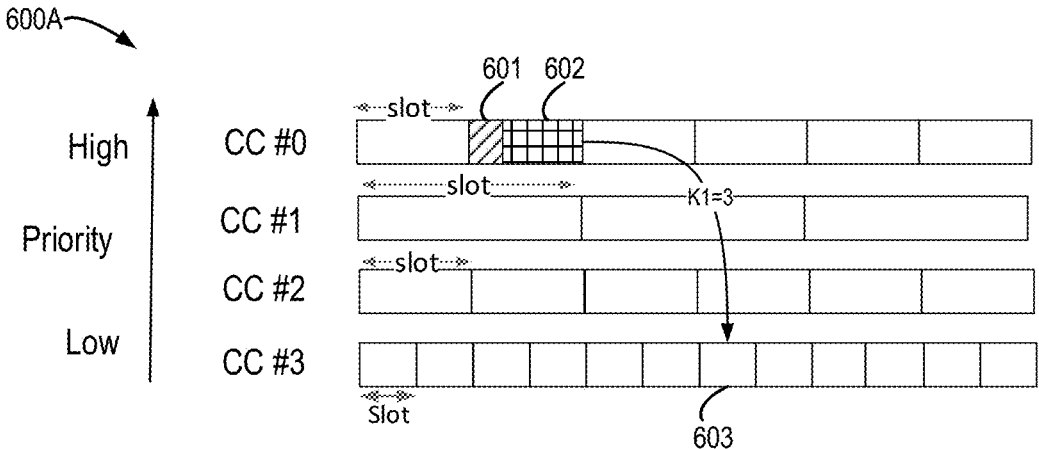
FIG. 6A illustrates a schematic diagram illustrating an example for determining a reference numerology according to embodiments of the present disclosure.

In this embodiment, the reference numerology is determined from numerologies corresponding to the set of cells. In this way, the reference slot can be determined accordingly. In some embodiments, the terminal device 110 may determine one of the numerologies associated with the largest subcarrier spacing (SCS) as the reference numerology. FIG. 6A illustrates a schematic diagram 600A illustrating an example for determining a reference numerology according to embodiments of the present disclosure.

As shown in FIG. 6A, the cell group comprises CC #0, CC #1, CC #2 and CC #3 with priorities from high to low. For CC #0, $\mu$=1, and SCS=30 KHz, where $\mu$ denotes an index of the numerology, also referred to as a subcarrier spacing configuration. For CC #1, and SCS=15 KHz. For CC #2, $\mu$=1, and SCS=30 KHz. For CC #3, $\mu$=2, and SCS=60 KHz. In this case, the numerology of CC #3 with the largest SCS may be determined as the reference numerology. For example, DCI 601 schedules PDSCH 602 and indicates a HARQ-ACK timing value K1=3. With the reference numerology of CC #3, a HARQ feedback for the PDSCH 602 will be transmitted in the reference slot 603.

Figure 6B:
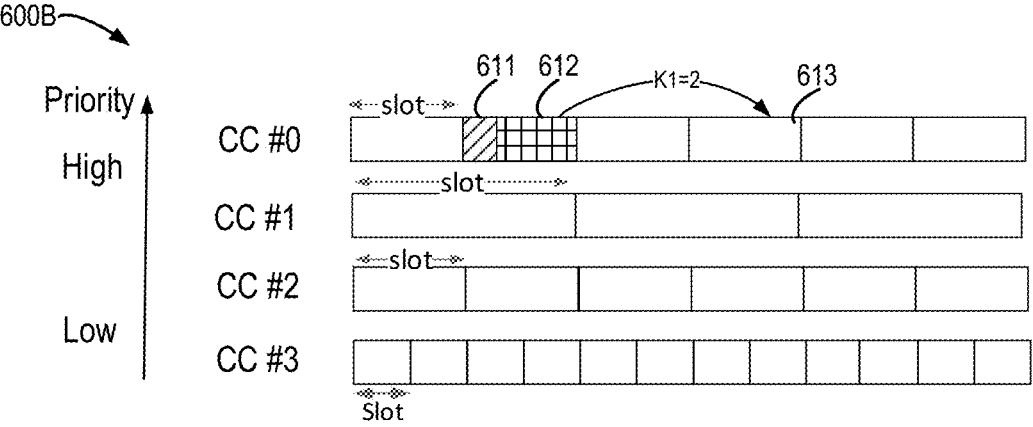
FIG. 6B illustrates a schematic diagram illustrating another example for determining a reference numerology according to embodiments of the present disclosure.

In some alternative embodiments, the terminal device 110 may determine one of the numerologies associated with a reference cell having the highest priority in the set of cells. FIG. 6B illustrates a schematic diagram 600B illustrating another example for determining a reference numerology according to embodiments of the present disclosure.

As shown in FIG. 6B, the cell group comprises CC #0, CC #1, CC #2 and CC #3 with priorities from high to low. For CC #0, $\mu$=1, and SCS=30 KHz, where $\mu$ denotes an index of the numerology. For CC #1, $\mu$=0, and SCS=15 KHz. For CC #2, $\mu$=1, and SCS=30 KHz. For CC #3, $\mu$=2, and SCS=60 KHz. In this case, the numerology of CC #0 with the highest priority may be determined as the reference numerology. For example, DCI 611 schedules PDSCH 612 and indicates a HARQ-ACK timing value K1=2. With the reference numerology of CC #0, a HARQ feedback for the PDSCH 612 will be transmitted in the reference slot 613.

Figure 6C:
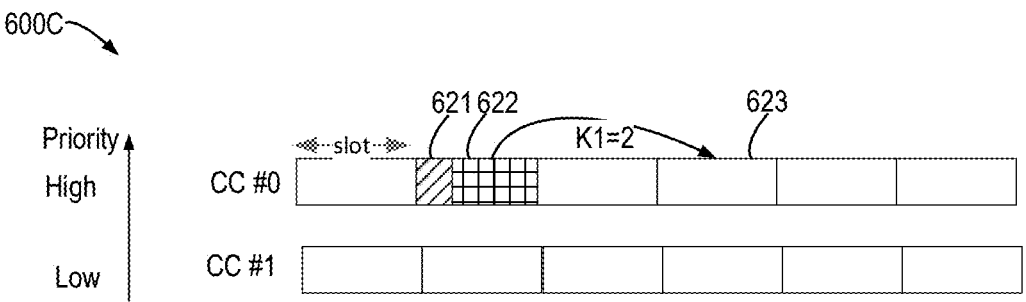
FIG. 6C illustrates a schematic diagram illustrating another example for determining a reference numerology according to embodiments of the present disclosure.

In some alternative embodiments, the set of cells is configured with the same numerology. In these embodiments, the terminal device 110 may determine a numerology configured for a cell in the set of cells. FIG. 6C illustrates a schematic diagram 600C illustrating another example for determining a reference numerology according to embodiments of the present disclosure.

As shown in FIG. 6C, the cell group comprises CC #0 and CC #1 with priorities from high to low. For CC #0, $\mu$=1, and SCS=30 KHz, where $\mu$ denotes an index of the numerology. For CC #1, $\mu$=1, and SCS=30 KHz. In this case, the numerology of CC #0 with the highest priority may be determined as the reference numerology. For example, DCI 621 schedules PDSCH 622 and indicates a HARQ-ACK timing value K1=2. With the reference numerology of CC #0, a HARQ feedback for the PDSCH 622 will be transmitted in the reference slot 623.

Upon determination of the reference slot, the terminal device 110 may determine the target cell from the set of cells for PUCCH transmission in the reference slot. In some embodiments, the terminal device 110 may determine a cell with the highest priority among available cells to transmit PUCCH for HARQ feedback. The available cells may refer to a cell having enough valid symbols (UL symbol or flexible symbol not configured for DL reception) within the reference slot to accommodate the PUCCH resource for HARQ feedback transmission. Some example embodiments for determination of the target cell will be described in connection with Embodiments 4 and 5.

Embodiment 4

In this embodiment, the reference numerology is associated with a reference cell having the highest priority in the set of cells. One or more cells in the set of cells may have different numerology configuration from the reference cell. In some embodiments, the terminal device 110 may determine one or more available cells from the set of cells based on TDD configurations of the cells in the set of cells and PUCCH resource allocation.

In some embodiments, if the index (II) of a numerology of a candidate cell in the set of PUCCH cells is larger than the index (II ref) of the reference numerology of the reference cell, the candidate cell has a plurality of slots corresponding to the reference slot. In this case, the terminal device 110 may determine whether the first slot in the plurality of slots has enough valid symbols to accommodate the uplink control transmission. If the first slot has enough valid symbols to accommodate the uplink control transmis- This Clause applies if the UE is configured with a set of cells for PUCCH transmission. With reference to slots for PUCCH transmissions on the cell with highest priority in the set of PUCCH cells, if the UE detects a DCI format scheduling a PDSCH reception ending in slot n or if the UE detects a DCI format indicating a SPS PDSCH release through a PDCCH reception ending in slot n, the UE provides corresponding HARQ-ACK information in a PUCCH transmission within slot n+k on the cell Cu,c, where k is a number of slots and is indicated by the PDSCH-to-HARQ feedback timing indicator field in the DCI format, if present, or provided by dl-DataToUL-ACK, or by dl-Data-ToUL-ACKForDCIFormat1_2 for DCI format 1_2, Cu,c is determined based on the following pseudo-code.

```
Cu is the set of cells configured by RRC for PUCCH transmission
Set N_cells^UL to the number of serving cells in the set Cu
Set c =0 – index of cell C_u, c within the set C_u : in ascending order of the priority of the
cell
in set C_u
    while c < N_cells^UL
        UE determines the one or more slots of the cell C_u, c corresponding to the slot n+k,
        If the first slot within the one or slot slots has enough valid symbols for
        PUCCH transmission on an active UL BWP of the cell Cu,c
            UE determines a PUCCH transmission for HARQ-ACK within the first
            slot on an active UL BWP of the cell Cu,c;
            break;
        else
            c = c+1;
        end if
    end while
``` sion, the terminal device 110 may determine the candidate cell as an available cell. An example will be described with reference to FIG. 7.

Figure 7:
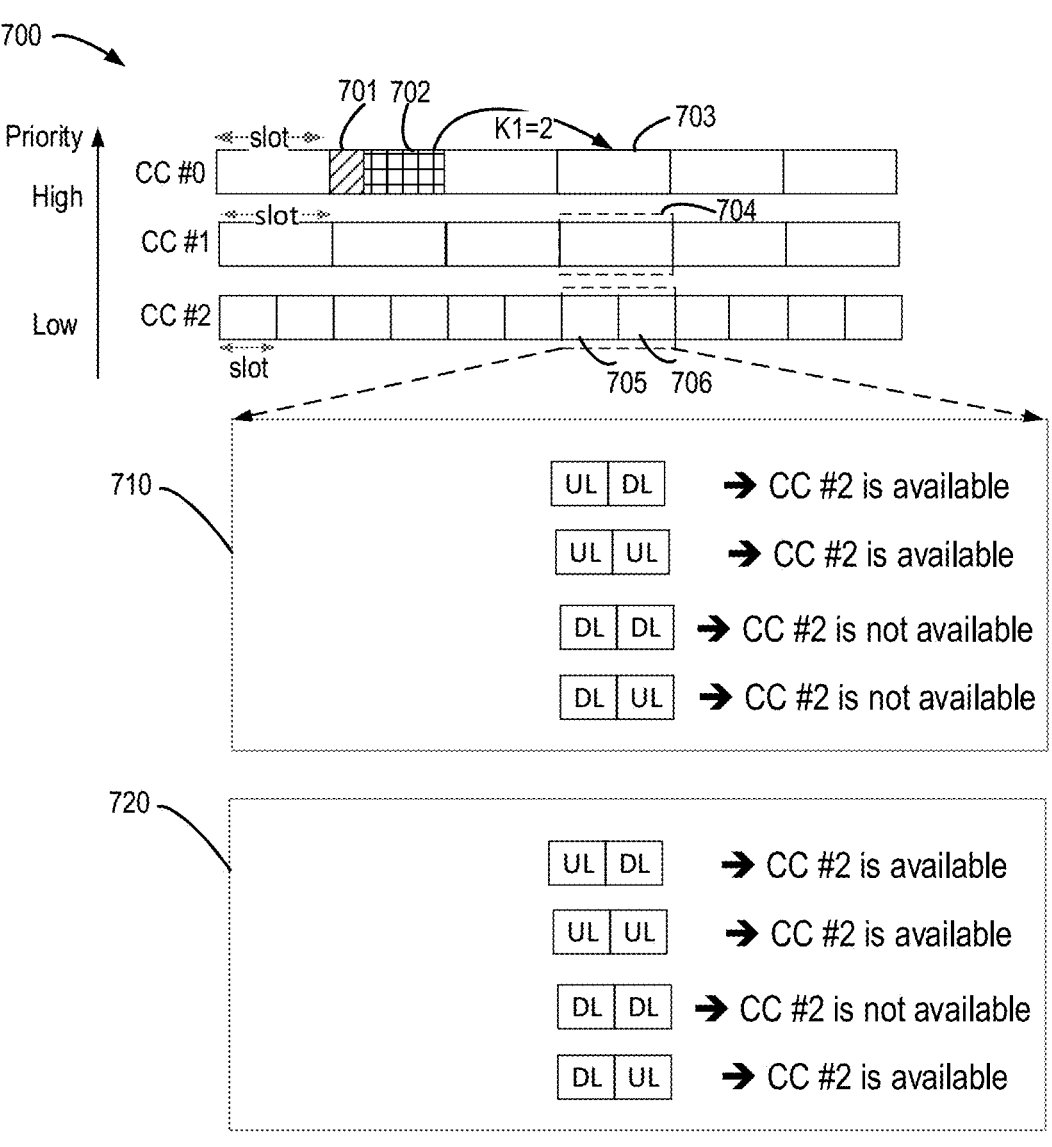
FIG. 7 illustrates a schematic diagram illustrating an example for determining a target cell for HARQ feedback according to embodiments of the present disclosure.

FIG. 7 illustrates a schematic diagram 700 illustrating an example for determining a target cell for PUCCH transmission for HARQ feedback according to embodiments of the present disclosure. As shown in FIG. 7, the cell group comprises CC #0, CC #1 and CC #2 with priorities from high to low. For CC #0, $\mu$=1, and SCS=30 KHz, where $\mu$ denotes an index of the numerology. For CC #1, $\mu$=1, and SCS=30 KHz. For CC #2, $\mu$=2, and SCS=60 KHz. In this example, the numerology of CC #0 with the highest priority is determined as the reference numerology. For example, DCI 701 schedules PDSCH 702 and indicates a HARQ-ACK timing value K1=2. With the reference numerology of CC #0, a HARQ feedback for the PDSCH 702 will be transmitted in the reference slot 703.

The reference slot 703 corresponds to a slot 704 on CC #1, and corresponds to two slots 705 and 706 on CC #2. Assuming that the slots 703 of CC #0 and slot 704 of CC #1 are DL slots, the candidate cell CC #0 and CC #1 are determined as unavailable cells for PUCCH transmission. In some embodiments, if the slot 705 of CC #2 has enough valid symbols to accommodate the PUCCH for PDSCH 702, the terminal device 110 may determine CC #2 as an available cell. In some embodiments, as shown by a TDD configuration 710 for slots 705 and 706, if the slot 705 is an UL slot having enough valid symbols to accommodate the PUCCH for PDSCH 702, the terminal device 110 may determine that CC #2 is available as the target cell. If the slot 705 is a DL slot, the terminal device 110 may determine that CC #2 as unavailable cell. Of course, the TDD configuration 710 is merely for illustration, and is not for limitation.

For these embodiments, the modification for 3GPP specification of 38.213 would be as below.

In some alternative embodiments, if an index ($\mu$) of a numerology of a candidate cell in the set of cells is larger than an index ($\mu$_ref) of the reference numerology and the candidate cell has a plurality of slots corresponding to the reference slot, the terminal device 110 may determine whether there is a slot configured with enough valid symbols to accommodate the uplink control transmission in the plurality of slots. If there is the slot to accommodate the uplink control transmission in the plurality of slots, the terminal device 110 may determine the candidate cell as an available cell. For example, if the available cell with the plurality of slots having valid symbols for PUCCH transmission is determined as the target cell, the terminal device 110 may transmit PUCCH on the earliest slot among the plurality of slots.

Still with reference to FIG. 7, if any one of the slots 705 and 706 has enough valid symbols to accommodate the PUCCH for PDSCH 702, the terminal device 110 may determine CC #2 as an available cell. For example, as shown by a TDD configuration 720 for slots 705 and 706, if any one of the slots 705 and 706 is an UL slot having enough valid symbols to accommodate the PUCCH for PDSCH 702, the terminal device 110 may determine that CC #2 is available for PUCCH transmission. If the slots 705 and 706 are DL slots, the terminal device 110 may determine that CC #2 is not available for PUCCH transmission. Of course, the TDD configuration 720 is merely for illustration, and is not for limitation.

For these embodiments, the modification for 3GPP specification of 38.213 would be as below.

This Clause applies if the UE is configured with a set of cells for PUCCH transmission. With reference to slots for PUCCH transmissions on the cell with highest priority in the set of PUCCH cells, if the UE detects a DCI format scheduling a PDSCH reception ending in slot n or if the UE detects a DCI format indicating a SPS PDSCH release through a PDCCH reception ending in slot n, the UE provides corresponding HARQ-ACK information in a PUCCH transmission within slot n+k on the cell $c_u$, where k is a number of slots and is indicated by the PDSCH-to-HARQ_feedback timing indicator field in the DCI format, if present, or provided by dl-DataToUL-ACK, or by dl-Data-ToUL-ACKForDCIFormat1_2 for DCI format 1_2, $c_u$ is determined based on the following pseudo-code.

```
Cu is the set of cells configured by RRC for PUCCH transmission
Set N_cells^UL to the number of serving cells in the set Cu
Set c =0 – index of cell C_u, c within the set C_u : in ascending order of the priority of the
cell
in set C_u
    while c < N_cells^UL
        If μ of cell C_u, c is larger than the μ of with highest priority,
            UE determines the multiple slots of the cell C_u, c corresponding to the slot n+k,
            If any slot within the multiple slots does not have enough valid symbols for
            PUCCH transmission on an active UL BWP of the cell Cu,c
                c = c + 1
            else
                UE determines a PUCCH transmission for HARQ-ACK within the first
                slot having enough valid symbols for PUCCH transmission on an active
                UL BWP of the cell Cu,c
                break;
            end if
        else
            if the slot of the cell Cu,c corresponding to the slot n+k has enough valid symbols
            for PUCCH transmission on an active UL BWP of the cell Cu,c
                UE determines the a PUCCH transmission for HARQ-ACK in the slot on an
                active UL BWP of the cell Cu,c;
                break;
            else
                c = c + 1
            end if
        end while
```

In some embodiments, if an index(μ) of a numerology of the target cell is smaller than an index ($μ\_ref$) of the reference numerology, only part of a slot in the target cell corresponds to the reference slot in the reference cell. In this case, the terminal device 110 does not expect the PUCCH resource for HARQ feedback for a first downlink data transmission on the target cell overlapping with another PUCCH resource for HARQ feedback for a second downlink data transmission on the reference cell scheduled later than the first downlink data transmission, in other words, the terminal device 110 may regard this case as an error.

In some alternative embodiments, if $μ<μ\_ref$ and only part of a slot in the target cell corresponds to the reference slot in the reference cell, the terminal device 110 may determine whether a first uplink control transmission on the target cell is overlapped with a second uplink control transmission on the reference cell. If the first uplink control transmission is overlapped with the second uplink control transmission, the terminal device 110 may cancel the first uplink control transmission. Alternatively, the terminal device 110 may determine multiplexed HARQ feedback information by multiplexing first HARQ feedback information in the first uplink control transmission with second HARQ feedback information in the second uplink control transmission, and transmit the multiplexed HARQ feedback information on the reference cell. An example will be described below with reference to FIG. 8.

Figure 8:
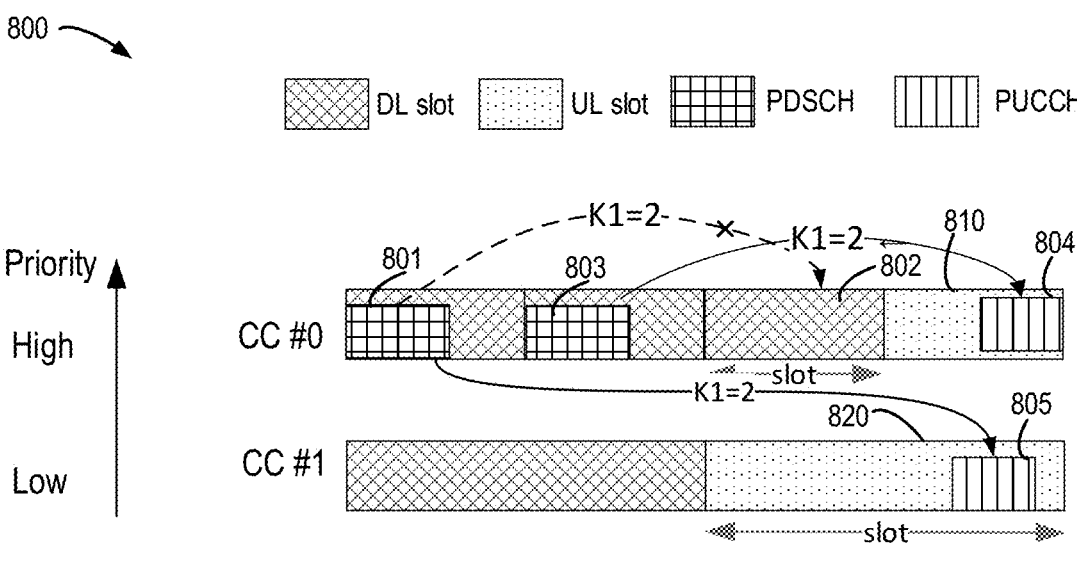
FIG. 8 illustrates a schematic diagram illustrating an example for transmitting HARQ feedback on a target cell according to embodiments of the present disclosure.

FIG. 8 illustrates a schematic diagram 800 illustrating an example for transmitting HARQ feedback on a target cell according to embodiments of the present disclosure. As shown in FIG. 8, the cell group comprises CC #0 and CC #1 with priorities from high to low. For CC #0, μ=1, and SCS=30 KHz. For CC #1, μ=0, and SCS=15 KHz. In this example, the numerology of CC #0 with the highest priority is determined as the reference numerology. For example, for PDSCH 801, assuming that a HARQ-ACK timing value K1=2 is indicated by DCI. With the reference numerology of CC #0, the reference slot is determined as the slot 802. As the slot 802 is a DL slot and is not available for transmission PUCCH for the PDSCH 801, the terminal device 110 may switch the PUCCH carrier for the PDSCH 801 to CC #1. In this case, PUCCH 805 for the PDSCH 801 can be transmitted in UL slot 820 on CC #1. However, there is a PDSCH 803 later than the PDSCH 801, and HARQ feedback of the PDSCH 803 is scheduled to be transmitted by PUCCH 804 in UL slot 810 on CC #0. The UL slot 810 corresponds to part of the UL slot 820. In this case, PUCCH 804 and PUCCH 805 will be overlapped with each other in time domain.

In some embodiments, if the PUCCH 805 for HARQ feedback for the PDSCH 801 on the target cell (CC #1) is overlapped with the PUCCH 804 for HARQ feedback for the PDSCH 803 on the reference cell (CC #0) scheduled later than the PDSCH 801, the terminal device 110 may determine that an error occurs. In some alternative embodiments, the terminal device 110 may cancel the PUCCH 805. Alternatively, the terminal device 110 may multiplex HARQ feedback information in the PUCCH 805 onto the PUCCH 804 and transmit the PUCCH 804 on CC #0 while cancelling the PUCCH 805. It is to be understood that this example is merely for illustration, and is not for limitation.

Embodiment 5

In this embodiment, the terminal device 110 may determine the target cell from the set of cells for the uplink control transmission configured with repetitions based on the number of the repetitions. In some embodiments, the terminal device 110 may determine one or more available cells (also referred to as a set of available cells herein) from the set of cells for the uplink control transmission configured with repetitions based on the number of the repetitions. Then the terminal device 110 may determine an available cell with highest priority as the target cell for a PUCCH transmission. In some embodiments, the reference numerology is also associated with a reference cell having the highest priority in the set of cells. In some embodiments, the reference numerology is the numerology associated with the largest SCS among SCS configuration of cells in the set of cells.

Figure 9A:
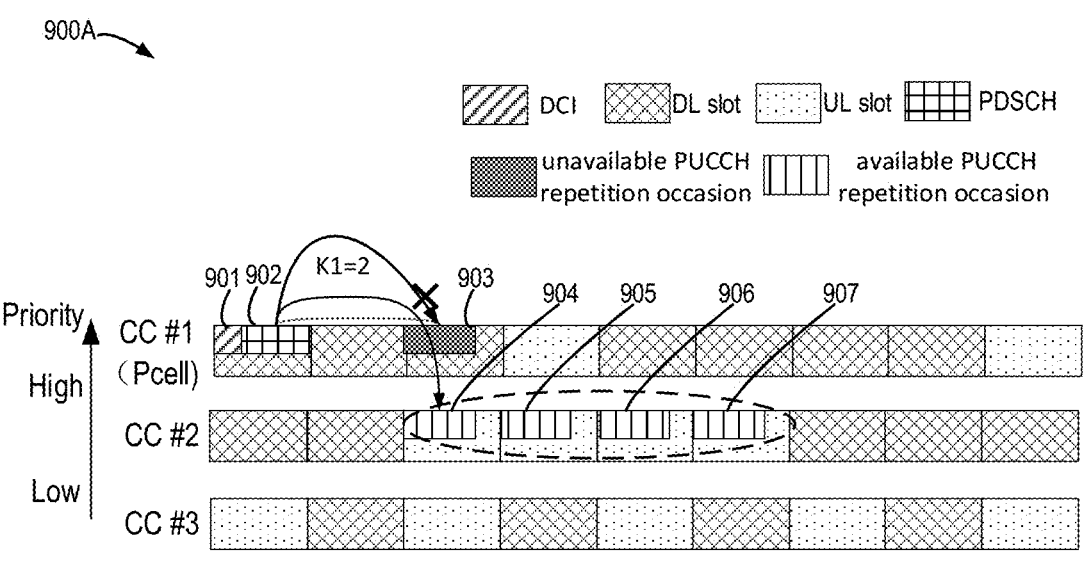
FIG. 9A illustrates a schematic diagram illustrating an example for determining a target cell for HARQ feedback based on repetitions according to embodiments of the present disclosure.

In some embodiments, the terminal device 110 may determine, as the target cell, a cell with the highest priority in the set of available cells that accommodates all the repetitions of the uplink control transmission (e.g., PUCCH transmission for the HARQ feedback). FIG. 9A illustrates a schematic diagram 900A illustrating an example for determining a target cell for HARQ feedback based on repetitions according to embodiments of the present disclosure. In this example, the number of repetitions for the PUCCH transmission is four.

As shown in FIG. 9A, DCI 901 schedules a HARQ feedback for a PDSCH 902 with HARQ-ACK timing value K1=2. With the reference numerology of CC #1, the reference slot is determined as slot 903. As the slot 903 is a DL slot and is not available for PUCCH repetition transmission, the terminal device 110 may determine whether CC #2 with the second highest priority is available. In this example, CC #2 has continuous UL slots 904 to 907 to accommodate all the repetitions of the PUCCH transmission, and thus is determined as the target cell. It is to be understood that this example is merely for illustration, and is not for limitation. In this way, repetitions of PUCCH transmission for HARQ feedback can be ensured.

Figure 9B:
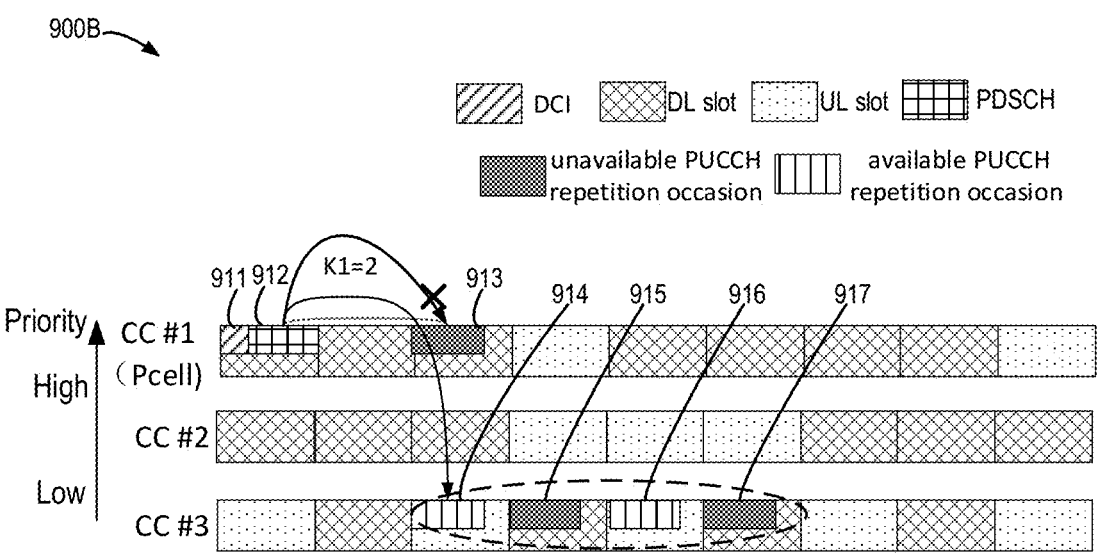
FIG. 9B illustrates a schematic diagram illustrating another example for determining a target cell for HARQ feedback based on repetitions according to embodiments of the present disclosure.

In some embodiments, the terminal device 110 may determine, as the target cell, a cell with the highest priority in the set of available cells that accommodates an earlier one of the repetitions of the uplink control transmission (e.g., PUCCH transmission for the HARQ feedback). FIG. 9B illustrates a schematic diagram 900B illustrating an example for determining a target cell for HARQ feedback based on repetitions according to embodiments of the present disclosure. In this example, the number of repetitions for the PUCCH transmission is four.

As shown in FIG. 9B, DCI 911 schedules a HARQ feedback for a PDSCH 912 with HARQ-ACK timing value K1=2. With the reference numerology of CC #1, the reference slot is determined as slot 913. In the slot 913, CC #1 and CC #2 are configured as DL slot, and CC #3 is configured as UL slot. That is, the earliest UL slot 914 is comprised on CC #3. Thus, the terminal device 110 may determine CC #3 as the target cell, and transmit repetitions for the PUCCH transmission on available slots 914 and 916, while the repetitions are not transmitted on unavailable slots 915 and 917. It is to be understood that this example is merely for illustration, and is not for limitation. In this way, low latency for HARQ feedback can be facilitated.

Figure 9C:
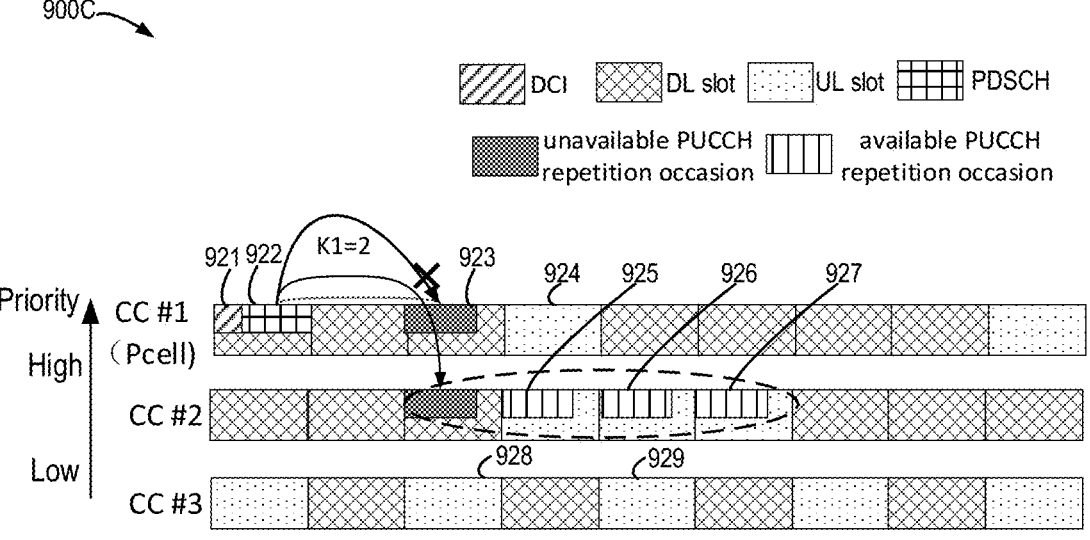
FIG. 9C illustrates a schematic diagram illustrating another example for determining a target cell for HARQ feedback based on repetitions according to embodiments of the present disclosure.

In some embodiments, the terminal device 110 may determine, as the target cell, a cell with the highest priority in the set of available cells that accommodates a largest number of the repetitions of the uplink control transmission (e.g., PUCCH transmission for the HARQ feedback) among the number of the repetitions of the uplink control transmission in the set of cells. FIG. 9C illustrates a schematic diagram 900C illustrating an example for determining a target cell for HARQ feedback based on repetitions according to embodiments of the present disclosure. In this example, the number of repetitions for the PUCCH transmission is four.

As shown in FIG. 9C, DCI 921 schedules a HARQ feedback for a PDSCH 922 with HARQ-ACK timing value K1=2. With the reference numerology of CC #1, the reference slot is determined as slot 923. With respect to the reference slot, CC #1 provides one UL slot 924 available for repetitions, CC #2 provides three UL slots 925 to 927 available for repetitions, and CC #3 provides two UL slots 928 and 929 available for repetitions. Thus, the terminal device 110 may determine CC #2 having the largest number of repetitions as the target cell, and transmit repetitions for the PUCCH transmission on available slots 925 to 927. It is to be understood that this example is merely for illustration, and is not for limitation. In this way, reliability for HARQ feedback can be ensured.

Figure 9D:
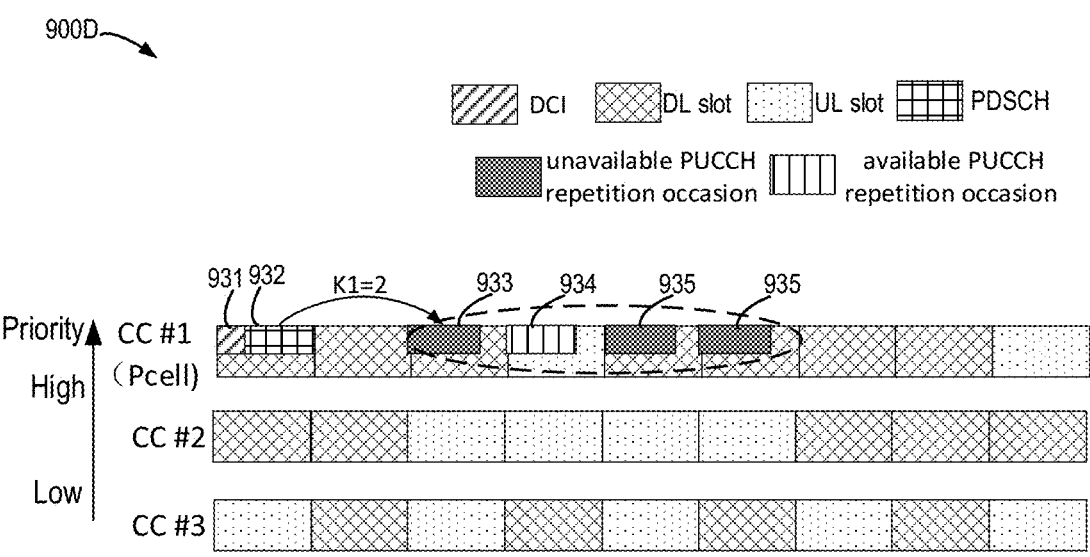
FIG. 9D illustrates a schematic diagram illustrating another example for determining a target cell for HARQ feedback based on repetitions according to embodiments of the present disclosure.

In some embodiments, the terminal device 110 may determine, as the target cell, a cell with the highest priority in the set of available cells that accommodates at least one of the repetitions of the uplink control transmission (e.g., PUCCH transmission for the HARQ feedback). FIG. 9D illustrates a schematic diagram 900D illustrating an example for determining a target cell for HARQ feedback based on repetitions according to embodiments of the present disclosure. In this example, the number of repetitions for the PUCCH transmission is four.

As shown in FIG. 9D, DCI 931 schedules a HARQ feedback for a PDSCH 932 with HARQ-ACK timing value K1=2. With the reference numerology of CC #1, the reference slot is determined as slot 933. With respect to the reference slot, CC #1 provides one UL slot 934 available for repetitions. Thus, the terminal device 110 may determine CC #1 as the target cell. It is to be understood that this example is merely for illustration, and is not for limitation. In this way, a less impact on 3GPP specification can be obtained.

Return to FIG. 3 again, upon determination of the target cell, the terminal device 110 may transmit 370 the PUCCH transmission for HARQ feedback to the network device 120 with an independent power control or joint power control on the set of cells. In some embodiments, which PUCCH power control scheme is applied for a PUCCH transmission occasion may be configured by a RRC signaling. Of course, the PUCCH power control scheme may also be predefined. Some example embodiments of the PUCCH power control scheme will be described below in connection with Embodiments 6 and 7.

Embodiment 6

In some embodiments, if a separate power control is configured for the PUCCH transmission on the set of cells, the terminal device 110 may determine a set of TPC command values received for the PUCCH transmission on the target cell in a time window. In some embodiments, the time window may be determined based on a current PUCCH transmission occasion and a previous PUCCH transmission occasion on the target cell. Then the terminal device 110 may determine transmission power for the PUCCH transmission on the target cell by accumulating the set of TPC command values received within the time window based on the transmission power of the previous PUCCH transmission occasion. In this way, the PUCCH transmission can be transmitted based on the determined transmission power, and thus reliability of the PUCCH transmission can be ensured. This will be described in detail with reference to FIG. 10A.

Figure 10A:
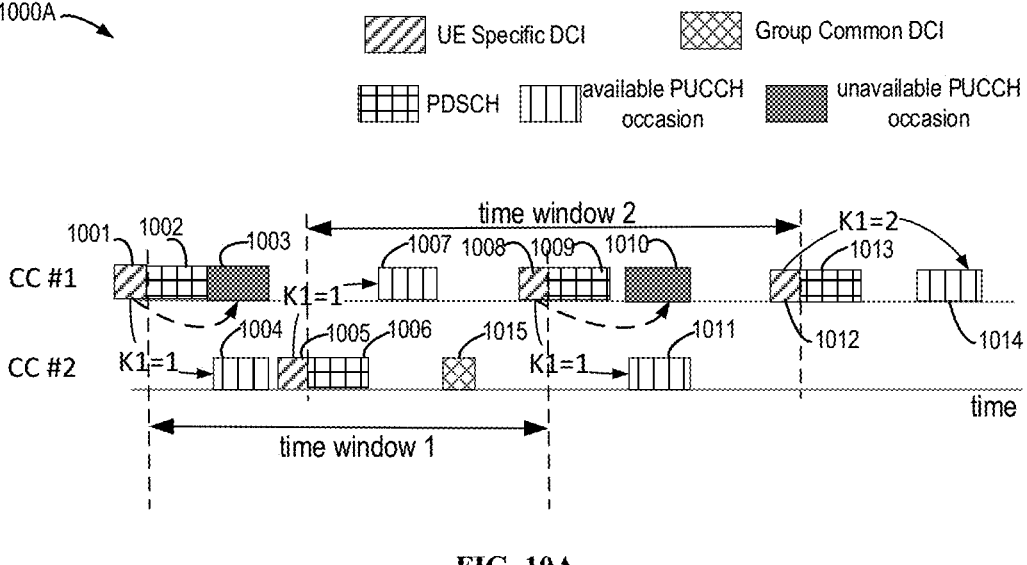
FIG. 10A illustrates a schematic diagram illustrating an example for determining a set of transmission power control (TPC) command values for independent power control according to embodiments of the present disclosure.

FIG. 10A illustrates a schematic diagram 1000A illustrating an example for determining a set of TPC command values for independent power control according to embodiments of the present disclosure. In this example of FIG. 10A, for the cell group comprising CC #1 and CC #2, CC #1 as Pcell with a high priority is configured for PUCCH transmission for HARQ feedback. That is, CC #1 is the target cell (i.e., PUCCH cell) for PUCCH transmission 1007 and PUCCH transmission 1014, CC #2 is the target cell for PUCCH transmission 1004 and PUCCH transmission 1011.

With reference to FIG. 10A, PUCCH transmission of a HARQ feedback for PDSCH 1002 scheduled by DCI 1001 is switched from unavailable PUCCH occasion 1003 on CC #1 to available PUCCH occasion 1004 on CC #2 based on the DCI 1001. A HARQ feedback for PDSCH 1006 scheduled by DCI 1005 is transmitted by PUCCH 1007 on CC #1. PUCCH transmission of a HARQ feedback for PDSCH 1009 scheduled by DCI 1008 is switched from unavailable PUCCH occasion 1010 on CC #1 to available PUCCH occasion 1011 on CC #2 based on the DCI 1008. A HARQ feedback for PDSCH 1013 scheduled by DCI 1012 is transmitted by PUCCH 1014 on CC #1.

Assuming that the PUCCH 1011 is the current PUCCH transmission occasion. In this case, the PUCCH cell is switched to CC #2, and the PUCCH 1004 is the previous PUCCH transmission occasion on the switched PUCCH cell (i.e., CC #2). In this example, the terminal device 110 may determine a time window (i.e., time window 1 as shown in FIG. 10A) based on an ending of the DCI 1008 associated with the current PUCCH transmission (i.e., PUCCH 1011) and an ending of the DCI 1001 associated with the previous uplink control transmission (i.e., PUCCH 1004). The DCI 1001 is earlier than the DCI 1008.

As another example, assuming that the PUCCH 1014 is the current PUCCH transmission occasion. In this case, the PUCCH cell is CC #1, and the PUCCH 1007 is the previous PUCCH transmission occasion on the PUCCH cell (i.e., CC #1). In this example, the terminal device 110 may determine a time window (i.e., time window 2 as shown in FIG. 10A) based on an ending of the DCI 1012 associated with the current PUCCH transmission (i.e., PUCCH 1014) and an ending of the DCI 1005 associated with the previous uplink control transmission (i.e., PUCCH 1007). The DCI 1005 is earlier than the DCI 1012.

In some embodiments, upon determination of the time window, the terminal device 110 may incorporate a TPC command value in the DCI for the PUCCH transmission on the target cell within the time window into the set of TPC command values. In some embodiments, the DCI may be DCI specific to the terminal device 110 (also referred to as UE specific DCI herein), for example, with DCI format 1_0 or 1_1. In some embodiments, the DCI may be DCI common for a UE group (also referred to as group common DCI herein), for example, with DCI format 2_2.

In some embodiments where the DCI is DCI specific to the terminal device 110 (also referred to as UE specific DCI herein), the terminal device 110 may incorporate a TPC command value in the UE specific DCI scheduling PUCCH on the target cell into the set of TPC command values. For example, in the time window 1 of FIG. 10A, DCI 1008 is UE specific DCI for the PUCCH transmissions 1011 on switched PUCCH cell CC #2 while DCI 1012 is UE specific DCI for the PUCCH transmissions 1014 on the CC #1, so that TPC command values in the DCI 1008 is incorporated in the set of TPC command values for PUCCH 1011. As another example, in the time window 2 of FIG. 10A, DCI 1012 is UE specific DCI for the PUCCH transmission 1014 on the PUCCH cell CC #1, so that TPC command value in the DCI 1012 is incorporated in the set of TPC command values for PUCCH 1014.

It can be seen from FIG. 10A that group common DCI 1015 is comprised in both the time window 1 and the time window 2. In this case, how to apply a TPC command value in the group common DCI 1015 needs to be studied. According to embodiments of the present disclosure, solutions for applying a TPC command value on group common DCI are proposed. In some embodiments, the group common DCI may be used for the PUCCH transmission on a cell with the highest priority in the set of cells. For example, in the example of FIG. 10A, DCI 1015 is group common DCI received on CC #2, and can be used for PUCCH 1014 on the CC #1 with the highest priority. Thus, the TPC command value in the DCI 1015 is incorporated in the set of TPC command values for PUCCH 1014.

In some alternative embodiments, the group common DCI may be used for the PUCCH transmission occasion nearest to the group common DCI. For example, in the example of FIG. 10A, DCI 1015 is group common DCI received on CC #2, and the PUCCH 1011 is nearest to the DCI 1015. Thus, the TPC command value in the DCI 1015 is incorporated in the set of TPC command values for the PUCCH 1011.

In some alternative embodiments, a mapping relation between the group common DCI and the set of cells for PUCCH transmission may be configured by the network device 120 to the terminal device 110, for example, by a RRC signaling or any other suitable ways. As an example, the group common DCI received on Pcell may be used for PUCCH transmission on Pcell. As another example, the group common DCI received on Scell may be used for PUCCH transmission on the switched Scell. For example, in the example of FIG. 10A, DCI 1015 is group common DCI received on CC #2. Thus, the TPC command value in the DCI 1015 is incorporated in the set of TPC command values for the PUCCH 1011 on CC #2. It is to be understood that this is merely an example, and any other suitable ways are also feasible.

In some alternative embodiments, a TPC command bit field in the group common DCI may be extended to be used for power control of PUCCH transmission on the set of cells. In other words, the group common DCI carriers multiple TPC command values for PUCCH transmissions on multiple cells. For example, if two cells are configured for PUCCH transmission, i.e. a PCell and a SCell, the first 2-bits in the TPC command bit field may be used for PUCCH transmission on Pcell, and the second 2-bits may be used for PUCCH transmission on the switched Scell. For example, in the example of FIG. 10A, DCI 1015 is group common DCI received on CC #2, and the first 2-bits in TPC command bit field of DCI 1015 is used for PUCCH transmission on CC #1, and the second 2-bits in TPC command bit field of DCI 1015 is used for PUCCH transmission on CC #2. Thus, the first 2-bits in TPC command bit field of DCI 1015 is incorporated in the set of TPC command values for the PUCCH 1015, and the second 2-bits in TPC command bit field of DCI 1015 is incorporated in the set of TPC command values for the PUCCH 1011. It is to be understood that this is merely an example, and any other suitable ways are also feasible.

So far, the separate power control is described for the PUCCH transmission for HARQ feedback. Embodiments of the present disclosure also provide a joint power control solution for the PUCCH transmission for HARQ feedback. This will be described in connection with Embodiment 7.

Embodiment 7

In some embodiments, if a joint power control is configured for the PUCCH transmission on the set of cells, the terminal device 110 may determine a time window based on an ending of first downlink control information associated with a current uplink control transmission and an ending of second downlink control information associated with a previous uplink control transmission, the previous uplink control transmission being earlier than the current uplink control transmission. In other words, for the time window for TPC command accumulation, it is the time gap between the ending of the PDCCH reception k associated with current PUCCH transmission occasion i and the ending symbol of the PDCCH reception k' associated with the latest PUCCH transmission occasion i' earlier than PUCCH transmission occasion i, meanwhile it has to satisfy that the PDCCH reception k' is earlier than PDCCH reception k. In some embodiments, the PUCCH transmission occasion i and PUCCH transmission occasion i' correspond to the same cell. In some alternative embodiments, the PUCCH transmission occasion i and PUCCH transmission occasion i' correspond to different cells.

Figure 10B:
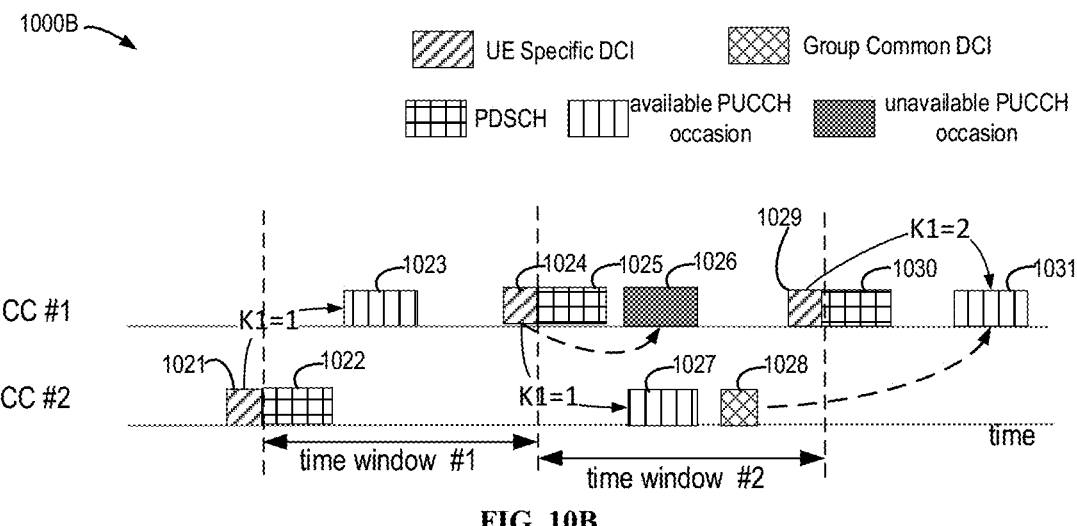
FIG. 10B illustrates a schematic diagram illustrating an example for determining a time window for joint power control according to embodiments of the present disclosure.

This will be described in detail with reference to FIG. 10B. FIG. 10B illustrates a schematic diagram 1000B illustrating an example for determining a set of TPC command values for joint power control according to embodiments of the present disclosure. In this example of FIG. 10B, for the cell group comprising CC #1 and CC #2, CC #1 as Pcell with a high priority is configured for PUCCH transmission for HARQ feedback. That is, CC #1 is the target cell.

With reference to FIG. 10B, a HARQ feedback for PDSCH 1022 scheduled by DCI 1021 is transmitted by PUCCH 1023 on CC #1. In this example, PUCCH transmission of a HARQ feedback for PDSCH 1025 scheduled by DCI 1024 is switched from unavailable PUCCH occasion 1026 on CC #1 to available PUCCH occasion 1027 on CC #2 based on the DCI 1024. A HARQ feedback for PDSCH 1030 scheduled by DCI 1029 is transmitted by PUCCH 1031 on CC #1.

In an example, assuming that the PUCCH 1031 scheduled by DCI 1029 is the current PUCCH transmission. In this case, the PUCCH 1027 scheduled by DCI 1024 is the previous PUCCH transmission within the cell group. Thus, the terminal device 110 may determine a time window (i.e., time window #2 as shown in FIG. 10B) based on an ending of the DCI 1029 associated with the current PUCCH transmission (i.e., PUCCH 1031) and an ending of the DCI 1024 associated with the previous uplink control transmission (i.e., PUCCH 1027).

In another example, assuming that the PUCCH 1027 scheduled by DCI 1024 is the current PUCCH transmission. In this case, the PUCCH 1023 scheduled by DCI 1021 is the previous PUCCH transmission within the cell group. Thus, the terminal device 110 may determine a time window (i.e., time window #1 as shown in FIG. 10B) based on an ending of the DCI 1024 associated with the current PUCCH transmission (i.e., PUCCH 1027) and an ending of the DCI 1021 associated with the previous uplink control transmission (i.e., PUCCH 1023).

Upon determination of the time window, the terminal device 110 may determine a set of TPC command values for the cells in the set of cells in the time window. In this case, all TPC command values in DCI received on the set of cells in the window are accumulated. In some embodiments where the DCI is UE specific DCI, the terminal device 110 may incorporate a TPC command value in the UE specific DCI into the set of TPC command values. For example, in the example of FIG. 10A for time window #2, DCI 1029 is UE specific DCI for the PUCCH transmissions on the target cell, and are incorporated in the set of TPC command values.

In some embodiments where the DCI is group common DCI, the terminal device 110 may incorporate a TPC command value in the group common DCI into the set of TPC command values. In this embodiment, solutions for applying TPC command on group common DCI as described in Embodiment 6 can also be applied. For example, in the example of FIG. 10B for time window #2, DCI 1028 is group common DCI received on CC #2. Assuming that the group common DCI is predefined or configured to be used for PUCCH transmission on a cell with the highest priority. In this case, a TPC command value in the DCI 1028 is also incorporated in the set of TPC command values for the time window #2.

Then the terminal device 110 may determine transmission power for the PUCCH transmission on the target cell by accumulating the set of TPC command values within the time window. In this way, the PUCCH transmission can be transmitted based on the determined transmission power, and thus reliability of the PUCCH transmission can be ensured.

Example Implementation of Methods

Accordingly, embodiments of the present disclosure provide methods of communication implemented at a terminal device and a network device. These methods will be described below with reference to FIGS. 11 to 12.

Figure 11:
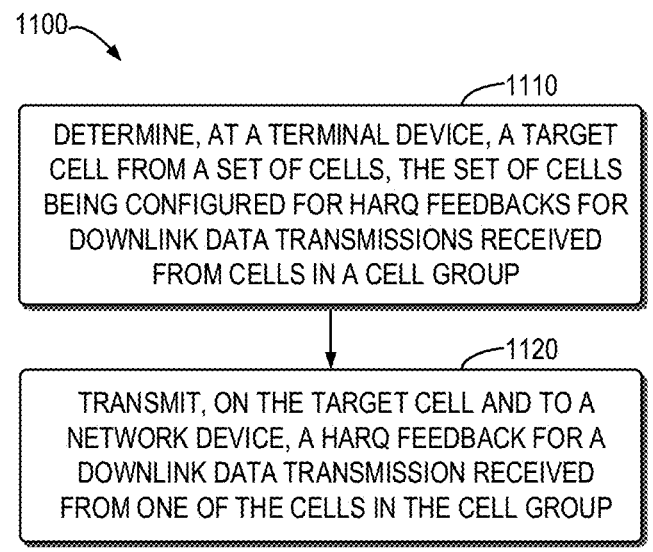
FIG. 11 illustrates an example method of communication implemented at a terminal device in accordance with some embodiments of the present disclosure.

FIG. 11 illustrates an example method 1100 of communication implemented at a terminal device in accordance with some embodiments of the present disclosure. For example, the method 1100 may be performed at the terminal device 110 as shown in FIG. 1. For the purpose of discussion, in the following, the method 1100 will be described with reference to FIG. 1. It is to be understood that the method 1100 may include additional blocks not shown and/or may omit some blocks as shown, and the scope of the present disclosure is not limited in this regard.

At block 1110, the terminal device 110 determines a target cell from a set of cells, the set of cells being configured for uplink control transmissions for HARQ feedbacks for downlink data transmissions received on cells in a cell group. The cells in the cell group are provided by the network device 120 to the terminal device 110, and serve the terminal device 110.

In some embodiments, the terminal device 110 may receive, from the network device 120, configurations for respective cells in the set of cells. In some embodiments, the terminal device 110 may receive, from the network device 120, a configuration comprising a first portion common for all cells in the set of cells and second portions dedicated for respective cells in the set of cells.

In some embodiments, the terminal device 110 may receive, from the network device 120, a MAC CE indicating a cell in the set of cells as the target cell, and determine the target cell based on the MAC CE.

In some embodiments, the cell group may comprise a first subgroup of cells and a second subgroup of cells, and the set of cells may comprise a first cell associated with the first subgroup of cells and a second cell associated with the second subgroup of cells. In these embodiments, the terminal device 110 may receive, from the network device 120, an indication that a third cell within the first subgroup of cells is switched to be associated with the second cell, and determine the second cell as the target cell for HARQ feedback for a downlink data transmission received from the third cell.

In some embodiments, the terminal device 110 may determine a reference numerology from numerologies corresponding to the set of cells, determine a reference slot based on a timing value for the HARQ feedback and the reference numerology, and determine the target cell from the set of cells in the reference slot.

In some embodiments, the terminal device 110 may determine, as the reference numerology, one of the numerologies associated with the largest subcarrier spacing. In some embodiments, the terminal device 110 may determine, as the reference numerology, one of the numerologies associated with a reference cell having the highest priority in the set of cells. In some embodiments, the terminal device 110 may determine, as the reference numerology, a numerology configured for a cell in the set of cells, the set of cells being configured with the same numerology.

In some embodiments where the reference numerology is associated with a reference cell having the highest priority in the set of cells, if an index of a numerology of a candidate cell in the set of cells is larger than an index of the reference numerology and the candidate cell has a plurality of slots corresponding to the reference slot, the terminal device 110 may determine whether the first slot in the plurality of slots has enough valid symbols to accommodate the uplink control transmission. If the first slot has enough valid symbols to accommodate the uplink control transmission, the terminal device 110 may determine the candidate cell as the target cell. Alternatively, the terminal device 110 may determine whether there is a slot configured with enough valid symbols to accommodate the uplink control transmission in the plurality of slots. If there is the slot to accommodate the uplink control transmission in the plurality of slots, the terminal device 110 may determine the candidate cell as the target cell.

In some embodiments, the terminal device 110 may determine the target cell for the uplink control transmission configured with repetitions based on the number of the repetitions. In some embodiments, the terminal device 110 may determine, as the target cell, a cell with the highest priority in the set of cells that accommodates all the repetitions of the uplink control transmission. In some embodiments, the terminal device 110 may determine, as the target cell, a cell with the highest priority in the set of cells that accommodates an earlier one of the repetitions of the uplink control transmission. In some embodiments, the terminal device 110 may determine, as the target cell, a cell with the highest priority in the set of cells that accommodates a largest number of the repetitions of the uplink control transmission among the number of the repetitions of the uplink control transmission in the set of cells. In some embodiments, the terminal device 110 may determine, as the target cell, a cell with the highest priority in the set of cells that accommodates at least one of the repetitions of the uplink control transmission.

At block 1120, the terminal device 110 transmits, on the target cell and to the network device 120, an uplink control transmission for a HARQ feedback for a downlink data transmission received on one of the cells in the cell group.

In some embodiments, the terminal device 110 may transmit, on the target cell, the uplink control transmission for the HARQ feedback for the downlink data transmission started after slot k+N, where k denotes an index of a slot for the uplink control transmission for HARQ feedback of the downlink data transmission comprising the indication, and N denotes a processing time for the HARQ feedback at the network device 120.

In some embodiments where the reference numerology is associated with a reference cell having the highest priority in the set of cells, if an index of a numerology of the target cell is smaller than an index of the reference numerology, the terminal device 110 may determine whether a first uplink control transmission on the target cell is overlapped with a second uplink control transmission on the reference cell. If the first uplink control transmission is overlapped with the second uplink control transmission, the terminal device 110 may determine that an error occurs.

In some embodiments, if an index of a numerology of the target cell is smaller than an index of the reference numerology associated with a reference cell having the highest priority in the set of cells, the terminal device 110 may determine whether a first uplink control transmission on the target cell is overlapped with a second uplink control transmission on the reference cell. If the first uplink control transmission is overlapped with the second uplink control transmission, the terminal device 110 may cancel the first uplink control transmission. Alternatively, if the first uplink control transmission is overlapped with the second uplink control transmission, the terminal device 110 may determine multiplexed HARQ feedback information by multiplexing first HARQ feedback information in the first uplink control transmission with second HARQ feedback information in the second uplink control transmission, and transmit the multiplexed HARQ feedback information on the reference cell.

In some embodiments, if separate power control is configured for the uplink control transmission on the set of cells, the terminal device 110 may determine a set of TPC command values for the uplink control transmission on the target cell in a time window, determine transmission power for the uplink control transmission on the target cell by accumulating the set of TPC command values, and transmit the uplink control transmission with the transmission power.

In some embodiments, if DCI specific to the terminal device 110 for scheduling the uplink control transmission on the target cell is received within the time window, the terminal device 110 may incorporate a TPC command value in the DCI specific to the terminal device into the set of TPC command values. In some embodiments, if group common DCI is received within the time window and the target cell has the highest priority in the set of cells, the terminal device 110 may incorporate a TPC command value in the group common DCI into the set of TPC command values. In some embodiments, if group common DCI is received within the time window and an uplink control transmission nearest to the group common DCI is on the target cell, the terminal device 110 may incorporate a TPC command value in the group common DCI into the set of TPC command values. In some embodiments, if group common DCI is received within the time window on a cell associated with the target cell, the terminal device 110 may incorporate a TPC command value in the group common DCI into the set of TPC command values. In some embodiments, if group common DCI is received within the time window, the terminal device 110 may incorporate a first TPC command value in a first set of bits of the group common DCI into the set of TPC command values, the first set of bits being associated with the target cell.

In some embodiments, if joint power control is configured for the uplink control transmission on the set of cells, the terminal device 110 may determine the time window based on an ending of first downlink control information associated with a current uplink control transmission and an ending of second downlink control information associated with a previous uplink control transmission, the previous uplink control transmission being earlier than the current uplink control transmission. The terminal device 110 may determine a set of TPC command values for the cells in the set of cells in the time window, determining transmission power for the uplink control transmission on the target cell by accumulating the set of TPC command values, and transmit the uplink control transmission with the transmission power.

In this way, PUCCH carrier switching can be achieved, and a latency for HARQ feedback can be reduced.

Figure 12:
FIG. 12 illustrates an example method of communication implemented at a network device in accordance with some embodiments of the present disclosure.

FIG. 12 illustrates an example method 1200 of communication implemented at a network device in accordance with some embodiments of the present disclosure. For example, the method 1200 may be performed at the network device 120 as shown in FIG. 1. For the purpose of discussion, in the following, the method 1200 will be described with reference to FIG. 1. It is to be understood that the method 1200 may include additional blocks not shown and/or may omit some blocks as shown, and the scope of the present disclosure is not limited in this regard.

As shown in FIG. 12, at block 1210, the network device 120 receives, from a terminal device, an uplink control transmission for a HARQ feedback on a target cell, the HARQ feedback for a downlink data transmission transmitted on one of cells in a cell group, the target cell being determined from a set of cells configured for an uplink control transmission for HARQ feedbacks for downlink data transmissions received on the cells in the cell group.

In some embodiments, the network device 120 may transmit configurations for respective cells in the set of cells. In some embodiments, the network device 120 may transmit a configuration comprising a first portion common for all cells in the set of cells and second portions dedicated for respective cells in the set of cells. In some embodiments, the network device 120 may transmit, to the terminal device 110, a MAC CE indicating a cell in the set of cells as the target cell.

In some embodiments, the cell group may comprise a first subgroup of cells and a second subgroup of cells, and the set of cells may comprise a first cell associated with the first subgroup of cells and a second cell associated with the second subgroup of cells. In these embodiments, the network device 120 may transmit, to the terminal device 110, an indication that a third cell within the first subgroup of cells is switched to be associated with the second cell.

In some embodiments, the network device 120 may receive, on the target cell, the HARQ feedback for the downlink data transmission started after slot k+N, where k denotes an index of a slot for the uplink control transmission for HARQ feedback of the downlink data transmission comprising the indication, and N denotes a processing time for the HARQ feedback at the network device 120.

In some embodiments, the network device 120 may determine a reference numerology from numerologies corresponding to the set of cells, determine a reference slot based on a timing value for the HARQ feedback and the reference numerology, and determine the target cell from the set of cells in the reference slot.

In some embodiments, the network device 120 may determine, as the reference numerology, one of the numerologies associated with the largest subcarrier spacing. In some embodiments, the network device 120 may determine, as the reference numerology, one of the numerologies associated with a reference cell having the highest priority in the set of cells. In some embodiments, the network device 120 may determine, as the reference numerology, a numerology configured for a cell in the set of cells, the set of cells being configured with the same numerology.

In some embodiments where the reference numerology is associated with a reference cell having the highest priority in the set of cells, if an index of a numerology of a candidate cell in the set of cells is larger than an index of the reference numerology and the candidate cell has a plurality of slots corresponding to the reference slot, the network device 120 may determine whether the first slot in the plurality of slots has enough valid symbols to accommodate the uplink control transmission. If the first slot has enough valid symbols to accommodate the uplink control transmission, the network device 120 may determine the candidate cell as the target cell.

Alternatively, the network device 120 may determine whether there is a slot configured with enough valid symbols to accommodate the uplink control transmission in the plurality of slots. If there is the slot to accommodate the uplink control transmission in the plurality of slots, the network device 120 may determine the candidate cell as the target cell.

In some embodiments wherein the reference numerology is associated with a reference cell having the highest priority in the set of cells, if an index of a numerology of the target cell is smaller than an index of the reference numerology, the network device 120 may determine whether a first uplink control transmission on the target cell is overlapped with a second uplink control transmission on the reference cell. If the first uplink control transmission is overlapped with the second uplink control transmission, the network device 120 may determine that an error occurs.

In some embodiments, the network device 120 may determine the target cell for the uplink control transmission configured with repetitions based on the number of the repetitions. In some embodiments, the network device 120 may determine, as the target cell, a cell with the highest priority in the set of cells that accommodates all the repetitions of the uplink control transmission. In some embodiments, the network device 120 may determine, as the target cell, a cell with the highest priority in the set of cells that accommodates an earlier one of the repetitions of the uplink control transmission. In some embodiments, the network device 120 may determine, as the target cell, a cell with the highest priority in the set of cells that accommodates a largest number of the repetitions of the uplink control transmission among the number of the repetitions of the uplink control transmission in the set of cells. In some embodiments, the network device 120 may determine, as the target cell, a cell with the highest priority in the set of cells that accommodates at least one of the repetitions of the uplink control transmission.

In some embodiments, the network device 120 may receive the uplink control transmission for the HARQ feedback transmitted with a transmission power, the transmission power being determined for the uplink control transmission on the target cell by accumulating a set of TPC command values, the set of TPC command values being determined for the uplink control transmission on the target cell in a time window in accordance with a determination that separate power control is configured for the uplink control transmission on the set of cells.

In some embodiments, the network device 120 may transmit, within the time window, DCI specific to the terminal device for scheduling the uplink control transmission on the target cell. In some embodiments, the network device 120 may transmit group common DCI, the group common DCI being used for a cell with the highest priority in the set of cells. In some embodiments, the network device 120 may transmit group common DCI, the group common DCI being used for an uplink control transmission nearest to the group common DCI. In some embodiments, the network device 120 may transmit a mapping between group common DCI and the cells in the set of cells. In some embodiments, the network device 120 may transmit group common DCI comprising a first TPC command value in a first set of bits and a second TPC command value in a second set of bits, the first set of bits and the second set of bits being associated with different cells in the set of cells.

In some embodiments, the network device 120 may receive the uplink control transmission for the HARQ feedback transmitted with a transmission power, the transmission power being determined for the uplink control transmission on the target cell by accumulating a set of TPC command values, the set of TPC command values being determined for the cells in the set of cells in a time window, the time window being determined based on an ending of first downlink control information associated with a current uplink control transmission and an ending of second downlink control information associated with a previous uplink control transmission, the previous uplink control transmission being earlier than the current uplink control transmission.

In this way, PUCCH carrier switching can be supported, and a reduced latency for HARQ feedback can be enabled.

Example Implementation of Device

Figure 13:
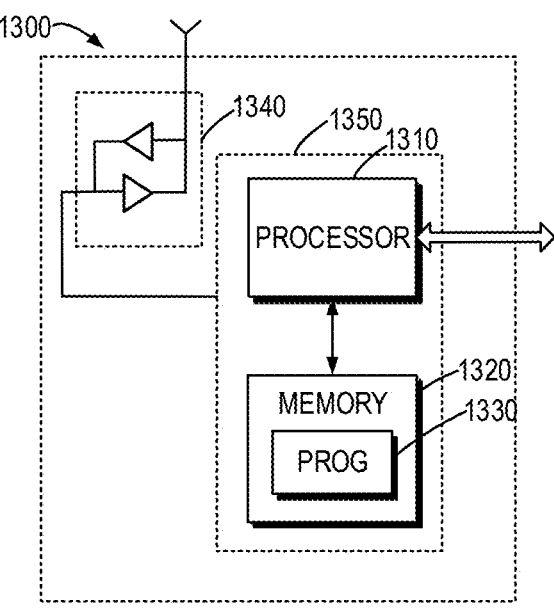
FIG. 13 is a simplified block diagram of a device that is suitable for implementing embodiments of the present disclosure.

FIG. 13 is a simplified block diagram of a device 1300 that is suitable for implementing embodiments of the present disclosure. The device 1300 can be considered as a further example implementation of the terminal device 110 or the network device 120 as shown in FIG. 1. Accordingly, the device 1300 can be implemented at or as at least a part of the terminal device 110 or the network device 120.

As shown, the device 1300 includes a processor 1310, a memory 1320 coupled to the processor 1310, a suitable transmitter (TX) and receiver (RX) 1340 coupled to the processor 1310, and a communication interface coupled to the TX/RX 1340. The memory 1310 stores at least a part of a program 1330. The TX/RX 1340 is for bidirectional communications. The TX/RX 1340 has at least one antenna to facilitate communication, though in practice an Access Node mentioned in this application may have several ones. The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 1330 is assumed to include program instructions that, when executed by the associated processor 1310, enable the device 1300 to operate in accordance with the embodiments of the present disclosure, as discussed herein with reference to FIGS. 3 to 12. The embodiments herein may be implemented by computer software executable by the processor 1310 of the device 1300, or by hardware, or by a combination of software and hardware. The processor 1310 may be configured to implement various embodiments of the present disclosure. Furthermore, a combination of the processor 1310 and memory 1320 may form processing means 1350 adapted to implement various embodiments of the present disclosure.

The memory 1320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1320 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

In some embodiments, a terminal device comprises circuitry configured to: determine a target cell from a set of cells, the set of cells being configured for uplink control transmissions for HARQ feedbacks for downlink data transmissions received on cells in a cell group; and transmit, on the target cell and to a network device, an uplink control transmission for a HARQ feedback for a downlink data transmission received on one of the cells in the cell group.

In some embodiments, the circuitry is further configured to at least one of the following: receive, from the network device, configurations for respective cells in the set of cells; or receive, from the network device, a configuration comprising a first portion common for all cells in the set of cells and second portions dedicated for respective cells in the set of cells.

In some embodiments, the cell group comprises a first subgroup of cells and a second subgroup of cells, and the set of cells comprises a first cell associated with the first subgroup of cells and a second cell associated with the second subgroup of cells. In these embodiments, the circuitry is configured to determine the target cell by receiving, from the network device, an indication that a third cell within the first subgroup of cells is switched to be associated with the second cell; and determining the second cell as the target cell for HARQ feedback for a downlink data transmission received from the third cell.

In some embodiments, the circuitry is configured to determine the target cell by receiving, from the network device, a MAC CE indicating a cell in the set of cells as the target cell; and determining the target cell based on the MAC CE.

In some embodiments, the circuitry is configured to transmit the uplink control transmission by transmitting, on the target cell, the uplink control transmission for the HARQ feedback for the downlink data transmission started after slot k+N, where k denotes an index of a slot for the uplink control transmission for HARQ feedback of the downlink data transmission comprising the indication, and N denotes a processing time for the HARQ feedback at the network device.

In some embodiments, the circuitry is configured to determine the target cell by determining a reference numerology from numerologies corresponding to the set of cells; determining a reference slot based on a timing value for the HARQ feedback and the reference numerology; and determining the target cell from the set of cells in the reference slot.

In some embodiments, the circuitry is configured to determine the reference numerology by at least one of the following: determining, as the reference numerology, one of the numerologies associated with the largest subcarrier spacing; determining, as the reference numerology, one of the numerologies associated with a reference cell having the highest priority in the set of cells; or determining, as the reference numerology, a numerology configured for a cell in the set of cells, the set of cells being configured with the same numerology.

In some embodiments where the reference numerology is associated with a reference cell having the highest priority in the set of cells, the circuitry may be configured to determine the target cell from the set of cells by in accordance with a determination that an index of a numerology of a candidate cell in the set of cells is larger than an index of the reference numerology and the candidate cell has a plurality of slots corresponding to the reference slot, determining whether the first slot in the plurality of slots has enough valid symbols to accommodate the uplink control transmission; and in accordance with a determination that the first slot has enough valid symbols to accommodate the uplink control transmission, determining the candidate cell as the target cell.

In some embodiments where the reference numerology is associated with a reference cell having the highest priority in the set of cells, the circuitry may be configured to determine the target cell from the set of cells by in accordance with a determination that an index of a numerology of a candidate cell in the set of cells is larger than an index of the reference numerology and the candidate cell has a plurality of slots corresponding to the reference slot, determining whether there is a slot configured with enough valid symbols to accommodate the uplink control transmission in the plurality of slots; and in accordance with a determination that there is the slot to accommodate the uplink control transmission in the plurality of slots, determining the candidate cell as the target cell.

In some embodiments, the circuitry may be further configured to: in accordance with a determination that an index of a numerology of the target cell is smaller than an index of the reference numerology, determine whether a first uplink control transmission on the target cell is overlapped with a second uplink control transmission on the reference cell; and if the first uplink control transmission is overlapped with the second uplink control transmission, determine that an error occurs, the reference numerology being associated with a reference cell having the highest priority in the set of cells.

In some embodiments, the circuitry may be further configured to: in accordance with a determination that an index of a numerology of the target cell is smaller than an index of the reference numerology associated with a reference cell having the highest priority in the set of cells, determine whether a first uplink control transmission on the target cell is overlapped with a second uplink control transmission on the reference cell; and in accordance with a determination that the first uplink control transmission is overlapped with the second uplink control transmission, cancel the first uplink control transmission.

In some embodiments, the circuitry may be further configured to: in accordance with a determination that an index of a numerology of the target cell is smaller than an index of the reference numerology, the reference numerology being associated with a reference cell having the highest priority in the set of cells, determine whether a first uplink control transmission on the target cell is overlapped with a second uplink control transmission on the reference cell; in accordance with a determination that the first uplink control transmission is overlapped with the second uplink control transmission, determine multiplexed HARQ feedback information by multiplexing first HARQ feedback information in the first uplink control transmission with second HARQ feedback information in the second uplink control transmission; and transmit the multiplexed HARQ feedback information on the reference cell.

In some embodiments, the circuitry may be configured to determine the target cell from the set of cells by determining the target cell for the uplink control transmission configured with repetitions based on the number of the repetitions.

In some embodiments, the circuitry may be configured to determine the target cell based on the number of the repetitions by at least one of the following: determining, as the target cell, a cell with the highest priority in the set of cells that accommodates all the repetitions of the uplink control transmission; determining, as the target cell, a cell with the highest priority in the set of cells that accommodates an earlier one of the repetitions of the uplink control transmission; determining, as the target cell, a cell with the highest priority in the set of cells that accommodates a largest number of the repetitions of the uplink control transmission among the number of the repetitions of the uplink control transmission in the set of cells; or determining, as the target cell, a cell with the highest priority in the set of cells that accommodates at least one of the repetitions of the uplink control transmission.

In some embodiments, the circuitry may be configured to transmit the uplink control transmission by in accordance with a determination that separate power control is configured for the uplink control transmission on the set of cells, determining a set of TPC command values for the uplink control transmission on the target cell in a time window; determining transmission power for the uplink control transmission on the target cell by accumulating the set of TPC command values; and transmitting the uplink control transmission with the transmission power.

In some embodiments, the circuitry may be configured to determine the set of TPC command values by at least one of the following: in accordance with a determination that DCI specific to the terminal device for scheduling the uplink control transmission on the target cell is received within the time window, incorporating a TPC command value in the DCI specific to the terminal device into the set of TPC command values; in accordance with a determination that group common DCI is received within the time window and the target cell has the highest priority in the set of cells, incorporating a TPC command value in the group common DCI into the set of TPC command values; in accordance with a determination that group common DCI is received within the time window and an uplink control transmission nearest to the group common DCI is on the target cell, incorporating a TPC command value in the group common DCI into the set of TPC command values; in accordance with a determination that group common DCI is received within the time window on a cell associated with the target cell, incorporating a TPC command value in the group common DCI into the set of TPC command values; or in accordance with a determination that group common DCI is received within the time window, incorporating a first TPC command value in a first set of bits of the group common DCI into the set of TPC command values, the first set of bits being associated with the target cell.

In some embodiments, the circuitry may be configured to transmit the uplink control transmission by: in accordance with a determination that joint power control is configured for the uplink control transmission on the set of cells, determining the time window based on an ending of first downlink control information associated with a current uplink control transmission and an ending of second downlink control information associated with a previous uplink control transmission, the previous uplink control transmission being earlier than the current uplink control transmission; determining a set of TPC command values for the cells in the set of cells in the time window; determining transmission power for the uplink control transmission on the target cell by accumulating the set of TPC command values; and transmitting the uplink control transmission with the transmission power.

In some embodiments, a network device comprises circuitry configured to: receive, at a network device and from a terminal device, an uplink control transmission for a HARQ feedback on a target cell, the HARQ feedback for a downlink data transmission transmitted on one of cells in a cell group, the target cell being determined from a set of cells configured for an uplink control transmission for HARQ feedbacks for downlink data transmissions received on the cells in the cell group.

In some embodiments, the circuitry may be further configured to at least one of the following: transmit configurations for respective cells in the set of cells; or transmit a configuration comprising a first portion common for all cells in the set of cells and second portions dedicated for respective cells in the set of cells. In some embodiments, the circuitry may be further configured to transmit, to the terminal device, a MAC CE indicating a cell in the set of cells as the target cell.

In some embodiments, the cell group comprises a first subgroup of cells and a second subgroup of cells, and the set of cells comprises a first cell associated with the first subgroup of cells and a second cell associated with the second subgroup of cells. In these embodiments, the circuitry may be further configured to transmit, to the terminal device, an indication that a third cell within the first subgroup of cells is switched to be associated with the second cell.

In some embodiments, the circuitry may be further configured to receive the uplink control transmission by receiving, on the target cell, the uplink control transmission for the HARQ feedback for the downlink data transmission started after slot k+N, where k denotes an index of a slot for the uplink control transmission for HARQ feedback of the downlink data transmission comprising the indication, and N denotes a processing time for the HARQ feedback at the network device.

In some embodiments, the circuitry may be configured to determine the target cell by: determining a reference numerology from numerologies corresponding to the set of cells; determining a reference slot based on a timing value for the HARQ feedback and the reference numerology; and determining the target cell from the set of cells in the reference slot.

In some embodiments, the circuitry may be configured to determine the reference numerology by at least one of the following: determining, as the reference numerology, one of the numerologies associated with the largest subcarrier spacing; determining, as the reference numerology, one of the numerologies associated with a reference cell having the highest priority in the set of cells; or determining, as the reference numerology, a numerology configured for a cell in the set of cells, the set of cells being configured with the same numerology.

In some embodiments where the reference numerology is associated with a reference cell having the highest priority in the set of cells, the circuitry may be configured to determine the target cell from the set of cells by: in accordance with a determination that an index of a numerology of a candidate cell in the set of cells is larger than an index of the reference numerology and the candidate cell has a plurality of slots corresponding to the reference slot, determining whether the first slot in the plurality of slots has enough valid symbols to accommodate the uplink control transmission; and in accordance with a determination that the first slot has enough valid symbols to accommodate the uplink control transmission, determining the candidate cell as the target cell.

In some embodiments where the reference numerology is associated with a reference cell having the highest priority in the set of cells, the circuitry may be configured to determine the target cell from the set of cells by: in accordance with a determination that a candidate cell in the set of cells has a plurality of slots corresponding to the reference slot, determining whether there is a slot configured with enough valid symbols to accommodate the uplink control transmission in the plurality of slots; and in accordance with a determination that there is the slot to accommodate the uplink control transmission in the plurality of slots, determining the candidate cell as the target cell.

In some embodiments, the circuitry may be further configured to: in accordance with a determination that an index of a numerology of the target cell is smaller than an index of the reference numerology associated with a reference cell having the highest priority in the set of cells, determine whether a first uplink control transmission on the target cell is overlapped with a second uplink control transmission on the reference cell; and if the first uplink control transmission is overlapped with the second uplink control transmission, determine that an error occurs.

In some embodiments, the circuitry may be configured to determine the target cell from the set of cells by determining the target cell for the uplink control transmission configured with repetitions based on the number of the repetitions. In some embodiments, the circuitry may be configured to determine the target cell based on the number of the repetitions by at least one of the following: determining, as the target cell, a cell with the highest priority in the set of cells that accommodates all the repetitions of the uplink control transmission; determining, as the target cell, a cell with the highest priority in the set of cells that accommodates an earlier one of the repetitions of the uplink control transmission; determining, as the target cell, a cell with the highest priority in the set of cells that accommodates a largest number of the repetitions of the uplink control transmission among the number of the repetitions of the uplink control transmission in the set of cells; or determining, as the target cell, a cell with the highest priority in the set of cells that accommodates at least one of the repetitions of the uplink control transmission.

In some embodiments, the circuitry may be configured to receive the uplink control transmission by receiving the uplink control transmission for the HARQ feedback transmitted with a transmission power, the transmission power being determined for the uplink control transmission on the target cell by accumulating a set of transmission power control (TPC) command values, the set of TPC command values being determined for the uplink control transmission on the target cell in a time window in accordance with a determination that separate power control is configured for the uplink control transmission on the set of cells.

In some embodiments, the circuitry may be further configured to at least one of the following: transmit, within the time window, DCI specific to the terminal device for scheduling the uplink control transmission on the target cell; transmit group common DCI, the group common DCI being used for a cell with the highest priority in the set of cells; transmit group common DCI, the group common DCI being used for an uplink control transmission nearest to the group common DCI; transmit a mapping between group common DCI and the cells in the set of cells; or transmit group common DCI comprising a first TPC command value in a first set of bits and a second TPC command value in a second set of bits, the first set of bits and the second set of bits being associated with different cells in the set of cells.

In some embodiments, the circuitry may be configured to receive the uplink control transmission by: receiving the uplink control transmission for the HARQ feedback transmitted with a transmission power, the transmission power being determined for the uplink control transmission on the target cell by accumulating a set of TPC command values, the set of TPC command values being determined for the cells in the set of cells in a time window, the time window being determined based on an ending of first downlink control information associated with a current uplink control transmission and an ending of second downlink control information associated with a previous uplink control transmission, the previous uplink control transmission being earlier than the current uplink control transmission.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 3 to 12. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, comprising:
   receiving, from a network device, a first physical uplink control channel (PUCCH) power control configuration of a primary cell and a second PUCCH power control configuration of a secondary cell configured for PUCCH cell switching, wherein a cell group comprises the primary cell and the secondary cell;

receiving, from the network device, an indication indicating that the secondary cell is used for PUCCH transmission, wherein the indication is based on at least one of a first downlink control information (DCI) and a higher layer configuration;

determining a PUCCH transmission power based on the second PUCCH power control configuration of the secondary cell and a transmit power control (TPC) command value indicated in the first DCI; and transmitting, to the network device, a hybrid automatic repeat request (HARQ) feedback, wherein the HARQ feedback is transmitted on the secondary cell with the PUCCH transmission power.

2. The method of claim 1, further comprising:

receiving, from the network device, a second DCI comprising a TPC command value corresponding to the primary cell and a TPC command value corresponding to the secondary cell.

3. The method of claim 2, wherein determining the PUCCH transmission power comprises:

determining the PUCCH transmission power further based on the TPC command value corresponding to the secondary cell.

4. A terminal device, comprising:

processor configured to cause to terminal device to:

receive, from a network device, a first physical uplink control channel (PUCCH) power control configuration of a primary cell and a second PUCCH power control configuration of a secondary cell configured for PUCCH cell switching, wherein a cell group comprises the primary cell and the secondary cell;

receive, from the network device, an indication indicating that the secondary cell is used for PUCCH transmission, wherein the indication is based on at least one of a first downlink control information (DCI) and a higher layer configuration;

determine a PUCCH transmission power based on the second PUCCH power control configuration of the secondary cell and a transmit power control (TPC) command value indicated in the first DCI; and transmitting, to the network device, a hybrid automatic repeat request (HARQ) feedback, wherein the HARQ feedback is transmitted on the secondary cell with the PUCCH transmission power.

5. The terminal device of claim 4, further comprising:

receiving, from the network device, a second DCI comprising a TPC command value corresponding to the primary cell and a TPC command value corresponding to the secondary cell.

6. The terminal device of claim 5, wherein determining the PUCCH transmission power comprises:

determining the PUCCH transmission power further based on the TPC command value corresponding to the secondary cell.

7. A method performed by a network device, comprising:

transmitting to a terminal device a first physical uplink control channel (PUCCH) power control configuration of a primary cell and a second PUCCH power control configuration of a secondary cell configured for PUCCH cell switching, wherein a cell group comprises the primary cell and the secondary cell;

transmitting, to the terminal device, an indication indicating that the secondary cell is used for PUCCH transmission, wherein the indication is based on at least one of a first downlink control information (DCI) and a higher layer configuration; and receiving, from the terminal device, a hybrid automatic repeat request (HARQ) feedback, wherein the HARQ feedback is transmitted on the secondary cell with a PUCCH transmission power determined based on the second PUCCH power control configuration of the secondary cell and a transmit power control (TPC) command value indicated in the first DCI.

8. The method of claim 7, further comprising:

transmitting to the terminal device, a second DCI comprising a TPC command value corresponding to the primary cell and a TPC command value corresponding to the secondary cell.

9. The method of claim 8, wherein determining the PUCCH transmission power comprises:

determining the PUCCH transmission power further based on the TPC command value corresponding to the secondary cell.

* * * * *